United States Patent
Cuan et al.

(10) Patent No.: US 11,120,093 B1
(45) Date of Patent: Sep. 14, 2021

(54) SYSTEM AND METHOD FOR PROVIDING A CONTENT ITEM BASED ON COMPUTER VISION PROCESSING OF IMAGES

(71) Applicant: Capital One Services, LLC, McLean, VA (US)

(72) Inventors: Lukiih Cuan, McLean, VA (US); Ljubica Chatman, McLean, VA (US); Xiaoguang Zhu, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/890,001

(22) Filed: Jun. 2, 2020

(51) Int. Cl.
*G06F 16/954* (2019.01)
*G06K 9/00* (2006.01)
*G06F 16/955* (2019.01)
*G06K 9/46* (2006.01)
*H04L 12/58* (2006.01)
*G06T 11/00* (2006.01)

(52) U.S. Cl.
CPC ........ *G06F 16/954* (2019.01); *G06F 16/9566* (2019.01); *G06K 9/00711* (2013.01); *G06K 9/46* (2013.01); *G06T 11/00* (2013.01); *H04L 51/32* (2013.01)

(58) Field of Classification Search
CPC ..... G06F 16/954; G06F 16/9566; G06K 9/46; G06K 9/00711; G06T 11/00; H04L 51/32
See application file for complete search history.

(56) References Cited

U.S. PATENT DOCUMENTS

| | | | |
|---|---|---|---|
| 2014/0100997 A1* | 4/2014 | Mayerle | G06Q 30/0276 705/27.2 |
| 2014/0164398 A1* | 6/2014 | Smith | G06F 16/24578 707/748 |
| 2016/0203525 A1* | 7/2016 | Hara | G06K 9/6277 705/14.56 |
| 2017/0034654 A1* | 2/2017 | Oberbeck | H04N 21/44213 |
| 2019/0141410 A1* | 5/2019 | Zverina | H04N 21/23424 |
| 2020/0402320 A1* | 12/2020 | Crews | G06F 1/1694 |

* cited by examiner

*Primary Examiner* — Maurice L. McDowell, Jr.
(74) *Attorney, Agent, or Firm* — Perkins Coie LLP; Ngai Zhang; Drew Schulte

(57) ABSTRACT

In certain embodiments, one or more images of an object may be received from a device associated with a first account on a communications network. Features of the object may be extracted based on the one or more images, and one or more content items related to the object may be determined based on the features. A hashtag associated with at least one of the features may be determined. A second account connected to the first account may be selected where the second account previously performed a search for the hashtag on the communications network, and at least one of the one or more content items may be provided to the second account.

15 Claims, 10 Drawing Sheets

SYSTEM AND METHOD FOR PROVIDING A CONTENT ITEM BASED ON COMPUTER VISION PROCESSING OF IMAGES

FIELD

The present application relates to providing content based on computer vision processing of images, including, for example, providing content based on features of an object extracted from one or more images and descriptors associated with the features.

BACKGROUND

Users of a communications network (e.g., a communications network) are commonly inundated with content items that are irrelevant or of little use. For instance, users may receive content items from connections with whom they barely communicate, which can be bothersome and detract from the user's experience with the communications network. Even strong connections of a user on the communications network may provide content items of little interest to the user. In addition to receiving unwanted content—whether from weak or strong connections—which can worsen user experience with the communications network, network resources may be consumed by providing the unwanted content to users, who otherwise might ignore, delete, or generally not be interested in the content item. These and other drawbacks exist.

SUMMARY

Aspects of the present application relate to methods, apparatuses, media, and/or systems for providing one or more content items determined based on computer vision processing of images.

In some embodiments, one or more images of an object may be received from a device, where the device is associated with a first account of a communications network. Features of the object may be extracted based on the one or more images, and one or more content items related to the object may be determined based on the features. A descriptor associated with at least one of the features may be determined, and at least a second account connected with the first account of the communications network may be selected based on the descriptor having been previously searched by the second account on the communications network. At least one of the content items may then be provided to the second account.

Various other aspects, features, and advantages of the present application will be apparent through the detailed description of the present application and the drawings attached hereto. It is also to be understood that both the foregoing general description and the following detailed description are examples and not restrictive of the scope of the present application.

DETAILED DESCRIPTION

In the following description, for the purposes of explanation, numerous specific details are set forth in order to provide a thorough understanding of the embodiments of the present application. It will be appreciated, however, by those having skill in the art that the embodiments of the present application may be practiced without these specific details or with an equivalent arrangement. In other cases, well-known structures and devices are shown in block diagram form in order to avoid unnecessarily obscuring the embodiments of the present application.

Figure 1:
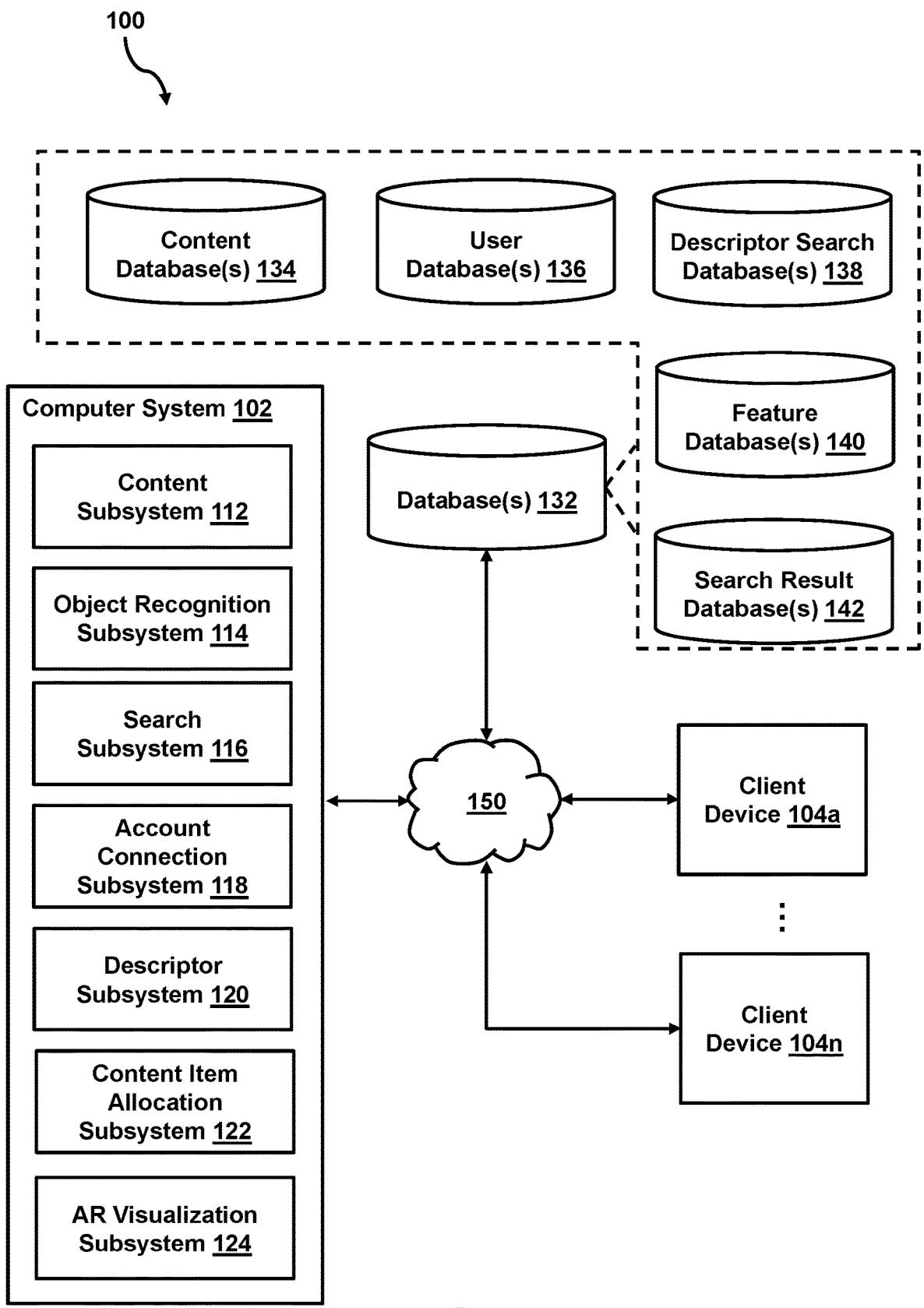
FIG. 1 shows an example of a system for providing content items based on computer vision processing of one or more images, in accordance with one or more embodiments.

FIG. 1 shows a system 100 for providing content based on computer vision processing of one or more images, in accordance with one or more embodiments. As shown in FIG. 1, system 100 may include computer system 102, client device 104 (or client devices 104a-104n), or other components. Computer system 102 may include content subsystem 112, object recognition subsystem 114, search subsystem 116, account connection subsystem 118, descriptor subsystem 120, content item allocation subsystem 122, augmented reality (AR) visualization subsystem 124, and/or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. An example computing system which may be implemented on or by client device 104 is described in greater detail below with respect to FIG. 10. It should be noted that while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should also be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 may be configured to determine one or more content items to be provided to one or more communications network connections of a user (or other connections of the user). The content items may be selected based on an object recognized within an image captured by the user's client device (e.g., client device 104), descriptors previously searched by the user's communications network connections, or other criteria. For example, users may perform searches for content items added and/or uploaded to a communications network. These content items include a descriptor indicating a particular topic related to the content items. For example, a descriptor may be a hashtag represented by a word or phrase. A hashtag, as described herein, may refer to a type of metadata tag that a user may apply, assign, and/or attribute to a content item indicating a related topic and/or context. In some embodiments, the descriptor may include a string of characters (e.g., numbers, letters, punctuations, etc.), which may be preceded by an identifying symbol. For example, a hashtag may include an octothorpe symbol, also referred to as a number sign or pound sign (e.g., "#"), as a prefix. A content item that has the hashtag attributed to it may be stored in memory in association with the hashtag such that if or when a user searches for the hashtag, the content item may be retrieved and provided to the user.

Improvements to communications networks may be obtained by providing a particular content item or items to a select, targeted, set of users connected to a user. Connections that may not be interested in a content item may not receive the content item, thereby improving that connection's user experience with the communications network or other user connection platform by preventing or minimizing the likelihood of that user receiving unwanted and irrelevant content items. Additionally, network resources to be used to provide the particular content to connections (who otherwise might ignore, delete, or generally not be interested in the content item) may be saved.

In some embodiments, a user may capture one or more images via their client device. The images may be stored in memory of the client device, extracted from a video, or may be part of a live image or video stream. For example, a mobile application for a communications network (e.g., a social media network) may include an image capture functionality whereby a user may capture an image or video and directly upload that image or video to the user's account on the communications network. As described herein, a live image stream refers to a continuous set of images captured by an image capture component, and may encompass live video as well. Thus, the term "live image stream" should not be construed to be limited to only images as videos may also be obtained via a same or similar image capture functionality. Furthermore, although some embodiments refer to a live image stream being captured, previously captured images or videos may also be obtained.

In some embodiments, the communications network's mobile application may include computer vision functionality, such as object recognition, configured to recognize the objects depicted within an image. The object recognition functionality may employ a convolution neural network (CNN) or other prediction model that has been trained using training data, such as, for example, ImageNet, to recognize whether a given image (from a live image stream or a previously captured image) includes an object. In some embodiments, the computer vision functionality may output an indication of an object detected within an image, including a name of the object, an identifier of the object, a bounding box surrounding a region of interest including the object, or other output information, or a combination thereof. For example, the computer vision functionality may detect the presence of a particular object (e.g., a human face, a landmark, an animal, etc.) within an image and may provide a notification of the detected object via the communications network's mobile application.

In some embodiments, a content item related to an object detected within an image may be determined. For example, a website related to an object detected within a live image stream may be determined. The content item may be provided to the user who captured the image and/or provided to one or more other users connected to the user. In some embodiments, the other users may be selected based on each user's respective prior search activity. For example, the other users' prior search activity on a communications network may be retrieved and analyzed to determine previously searched topics, content items, descriptors, etc. Some embodiments include logging each instance of a user searching a particular descriptor on the communications network. A user may input the descriptor (e.g., some or all of a hashtag) into a query input field of the communications network's mobile application, and content items, messages, users, accounts, or other relevant data may be retrieved that is related to the input descriptor. Alternatively, or additionally, a user may select a descriptor associated with a content item (e.g., a hashtag displayed in association with a post on a social media network). For example, a user may click or tap (e.g., via a stylus or finger) a hashtag displayed with a content item posted to a social media network, which may cause other content items that also include the same hashtag to be retrieved. Each search of a descriptor may be logged by system 100 with a corresponding user that performed the search. In some embodiments, upon determining a content item related to an object detected within a live image stream captured by a user's client device, one or more descriptors related to that content item may be determined, and other user search activity with respect to the determined descriptors may be obtained. Based on the other user search activity, one or more other users connected to the user may be selected and provided with the content item. In this way, users who are likely to be interested in the content item are provided with the content item, thereby reducing the amount of unnecessary content received by a user, increasing user satisfaction with the communications network.

In some embodiments, the determined content items may be provided to a user, such as the user who captured the live image stream depicting the object related to the content item and/or another user connected to the user who is determined to have previously searched for a descriptor related to the object, the content item, or both. The content items may be provided as messages or posts via the communications network's mobile application, SMS messages, emails, or via other communications techniques. Some embodiments include generating an augmented reality visualization related to the content item and providing the augmented reality visualization to the user. The augmented reality visualization may include a link to a uniform resource locator (URL) of a website whereby the content item may be consumed by the user (e.g., viewed, downloaded, or otherwise accessed). In some embodiments, the augment reality visualization may be rendered within a user interface (UI) of the communications network's mobile application of the user with whom the content item is to be provided. For example, an augmented reality visualization of the link to the content item may be overlaid on the content displayed by the UI. If a corresponding user clicks, taps, long presses, or otherwise selects the augmented reality visualization, that user may be directed to the content item (e.g., a website whereby the content item may be viewed). Thus, a user who may find a particular content item of interest, where the content item is determined to be related to an object recognized within a live image stream captured by another user, may automatically be provided with a mechanism with which to access the content item that is non-intrusive and streamlined within the communications network's mobile application experience.

Subsystems 112-120

In some embodiments, content subsystem 112 may be configured to obtain and provide content to one or more users of a communications network. A user may access a communications network via client device 104. Content subsystem 112 may retrieve content stored in content database 134 and provide some or all of the content to various users with whom access a corresponding communications network via their respective client devices (e.g., client devices 104). Content database 134 may store content items that have been uploaded by users having accounts on the communications network. The content items may be communications network posts, which may refer to data structures having values fillable by users. An example data structure of a communications post (e.g., a social media network post) may include a unique post identifier, an author identifier, a pseudonym or other naming scheme of the author on the communications network, temporal data indicating a time that the post was added to published content of the communications network's website, location data of the posting user's location, content to be posted to the communications network (e.g., a picture, a video, a link to a website, etc.), an indication of other users that may be able to view the communications post, as well as other aspects. The data structure may, for example, be a JSON file or another data format. Additionally, or alternatively, content database 134 may store images, videos, text documents, links, and the like. Content items may be retrieved from content database 134 continuously, periodically, in response to a request, or a combination thereof, and uploaded to the communications network's website. Users with permission to view some or all of the content items may do so by accessing the communications network via the communications network's website, via a mobile application executing one or more computer program instructions to view a mobile version of the website (e.g., via one or more Javascripts executing on client device 104).

In some embodiments, content subsystem 112 may be configured to receive a live image stream from a client device 104. A user may access the communications network via a web browser or via a mobile application of the communications network executing on client device 104, or via another mechanism. In some embodiments, the mobile application of the communications network may include or be otherwise communicatively coupled to an image capture functionality of client device 104. For example, the communications network's mobile application may include a data object that, when invoked, causes a camera of client device 104 to begin capturing image data. The image data may be transmitted across network(s) 150 to content subsystem 112, as well as, or alternatively, to other subsystems of computer system 102, or other components of system 100. In some embodiments, a user may invoke an image capture functionality of client device 104 (e.g., a camera of client device 104), capture an image, video, or both, and may provide the capture image and/or video to content subsystem 112, as well as, or alternatively, to other subsystems of computer system 102, or other components of system 100. Alternatively or additionally, a user may provide an image, video, or other content item to the communications network, which may not be part of a live image stream. For example, a user may capture an image using a camera of client device 104 and upload that image to their account on the communications network.

Figure 2:
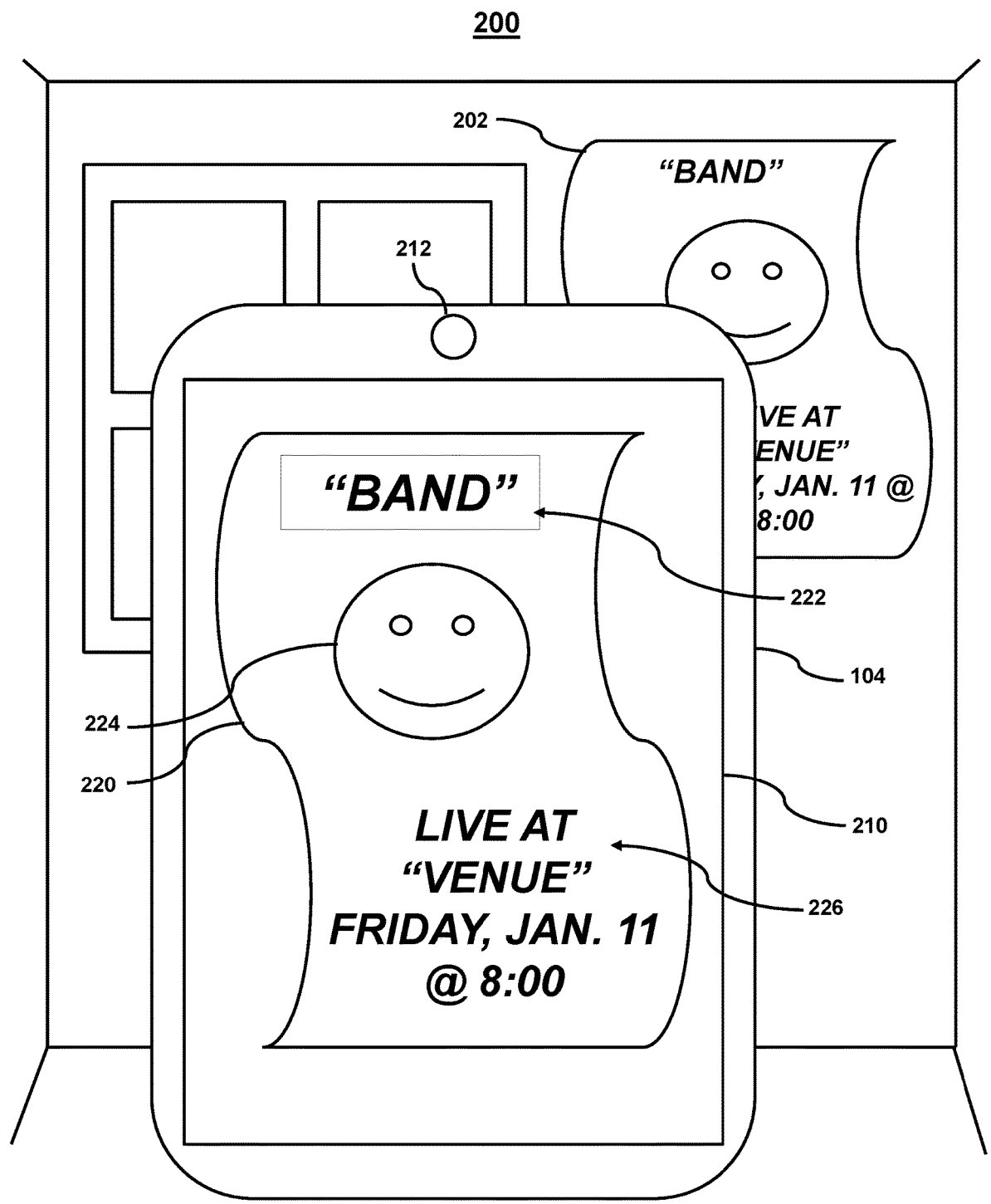
FIG. 2 shows an example of a client device receiving a live image stream depicting an object, in accordance with one or more embodiments.

As an example with reference to FIG. 2, a scene 200 may include client device 104 capturing an image, which may be part of a live image stream provided to a communications network, of an object, such as a poster 202. For example, client device 104 may employ a camera component 212 (which may be a rear facing camera, a front facing camera, or another image capturing component, or a combination thereof) to capture an image of poster 202 hanging on a wall of a room, as shown in scene 200. In some embodiments, a representation of the image, or a view of the data captured by camera component 212, may be rendered on UI 210 displayed by the display screen of client device 104. For example, a view of poster 202, as seen by camera component 212 of client device 104, may be rendered on UI 210.

In some embodiments, poster rendering 220 may represent poster 202 rendered on UI 210. Poster rendering 220 may visually depict poster 202, including text items 222 and 226 and image item 224. As an example, poster 202 may be a poster of an event where a particular musician or musical group performed. Poster 202 may include information indicating the name of the musician or musical group, information regarding the event (e.g., a name of the venue where the event occurred, a date and/or time of the event, etc.), as well as a picture of the musician or musical group. Poster rendering 220 may similarly depict the same information from poster 202. For instance, text item 222 may indicate a name of the musician or musical group (e.g., "Band"), text item 226 may indicate the name of the venue where the musician or musical group performed (e.g., "Live at 'Venue' Friday, January 11 @ 8:00"), and image item 224 may be a picture of the musician or musical group.

In some embodiments, object recognition subsystem 114 may be configured to receive the captured image, live image stream, or other input image data, and determine whether any objects are depicted therein. In some embodiments, object recognition subsystem 114 may include computer vision functionality capable of performing object recognition to an image, a frame of a live image stream, a frame of a video, and the like. Object recognition may refer to a process whereby an image is analyzed to determine whether any objects are present, a location of each object (if more than one), and a classification of that object indicating a known category of the object. In some embodiments, object recognition subsystem 114 may be configured to extract features of an object depicted within an image using one or more object recognition models. The object recognition models may include pre-trained object recognition models, each having been trained using a training data set including a set of images of depicting various objects. The set of images included by the training data set may be labeled or not labeled, depending on the object recognition model to be used. In some embodiments, the object recognition model may be a machine learning model, such as a convolutional neural network (CNN). However, various other types of machine learning models may be used including, but not limited to, to (which is not to suggest that any other list is limiting) any of the following: Ordinary Least Squares Regression (OLSR), Linear Regression, Logistic Regression, Stepwise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAID), Decision Stump, M5, Conditional Decision Trees, Naive Bayes, Gaussian Naive Bayes, Causality Networks (CN), Multinomial Naive Bayes, Averaged One-Dependence Estimators (AODE), Bayesian Belief Network (BBN), Bayesian Network (BN), k-Means, k-Medians, K-cluster, Expectation Maximization (EM), Hierarchical Clustering, Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Deep Boltzmann Machine (DBM), Deep Belief Networks (DBN), Deep Metric Learning, Stacked Auto-Encoders, Dimensionality Reduction Algorithms, Principal Component Analysis (PCA), Principal Component Regression (PCR), Partial Least Squares Regression (PLSR), Collaborative Filtering (CF), Latent Affinity Matching (LAM), Cerebri Value Computation (CVC), Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Computational intelligence (evolutionary algorithms, etc.), Computer Vision (CV), Natural Language Processing (NLP), Recommender Systems, Reinforcement Learning, Graphical Models, or separable convolutions (e.g., depth-separable convolutions, spatial separable convolutions).

In some embodiments, the object recognition model used by object recognition subsystem 114 may be configured to perform feature extraction process to extract features from an image (e.g., a received image or a frame from a live image stream). The process of extracting features from an image represents a technique for reducing the dimensionality of an image, which may allow for simplified and expedited processing of the image, such as in the case of object recognition. An example of this concept is an N×M pixel red-blue-green (RBG) image being reduced from N×M×3 features to N×M features using a mean pixel value process of each pixel in the image from all three-color channels. Another example of feature extraction process is edge feature detection. In some embodiments, a Prewitt kernel or a Sobel kernel may be applied to an image to extract edge features. In some embodiments, edge features may be extracted using feature descriptors, such as a histogram of oriented gradients (HOG) descriptor, a scale invariant feature transform (SIFT) descriptor, or a speeded-up robust feature (SURF) description.

In some embodiments, the feature extraction process may be performed using a deep learning process. For example, a deep CNN, trained on a large set of training data (e.g., the AlexNet architecture, which includes 5 convolutional layers and 3 fully connected layers, trained using the ImageNet dataset) may be used to extract features from an image. In some embodiments, a pre-trained machine learning model may be obtained and used for performing feature extraction for images. In some embodiments, a support vector machine (SVM) may be trained with a training data to obtain a trained object recognition model for performing feature extraction. In some embodiments, a classifier may be trained using extracted features from an earlier layer of the machine learning model. In some embodiments, preprocessing may be performed to an input image prior to the feature extraction being performed. For example, preprocessing may include resizing, normalizing, cropping, or the like, to allow that image to serve as an input to the pre-trained model. Example pre-trained networks may include AlexNet, GoogLeNet, MobileNet-v1, MobileNet-v2, MobileNet-v3, and others. Each of the images of the training data set may be fed to the pre-trained model, which may extract features, and those features may then be used to train a classifier (e.g., SVM). In some embodiments, the input images, the features extracted from each of the input images, an identifier labeling each of the input image, or any other aspect capable of being used to describe each input image, or a combination thereof, may be stored in memory, such as via feature database 140. In some embodiments, a feature vector describing visual features extracted from each image, a context of the image, and an object or objects determined to be depicted by the image, and the like, may be stored by feature database 140.

In some embodiments, instead of object recognition subsystem 114 performing object recognition on an image, the object recognition model may be deployed to client device 104, which may perform object recognition on the local version of the image prior to or instead of sending the image to computer system 102. Object recognition subsystem 114 may thus be configured to generate, train, and/or deploy the object recognition model (trained or untrained) to client device 104. Some embodiments may include the object recognition model being deployed as a component of the communications network's mobile application such that object recognition may be performed on an image prior to sending the image to computer system 102. In some embodiments, the object recognition model may be generated using a neural network architecture that runs efficiently on mobile computing devices (e.g., smart phones, tablet computing devices, etc.). Some examples of such neural networks include, but are not limited to MobileNet-v1, MobileNet-v2, MobileNet-v3, ResNet, NASNet, EfficientNet, and others. With these neural networks, convolutional layers may be replaced by depthwise separable convolutions. For example, the depthwise separable convolution block includes a depthwise convolution layer to filter an input, followed by a pointwise (e.g., 1×1) convolution layer that combines the filtered values to obtain new features. The result is similar to that of a conventional convolutional layer but faster and more compatible with the processing and memory characteristics of client device 104. Generally, neural networks running on mobile computing devices (e.g., client devices 104) include a stack or stacks of residual blocks. Each residual block may include an expansion layer, a filter layer, and a compression layer. With MobileNet-v2, three convolutional layers are included: a 1×1 convolution layer, a 3×3 depthwise convolution layer, and another 1×1 convolution layer. The first 1×1 convolution layer may be the expansion layer and operates to expand the number of channels in the data prior to the depthwise convolution, and is tuned with an expansion factor that determines an extent of the expansion and thus the number of channels to be output. In some examples, the expansion factor may be six; however the particular value may vary depending on the system. The second 1×1 convolution layer, the compression layer, may reduce the number of channels, and thus the amount of data, through the network. In MobileNet-v2, the compression layer includes another 1×1 kernel. Additionally, with MobileNet-v2, there is a residual connection to help gradients flow through the network and connects the input to the block to the output from the block. As described herein, any object recognition processing or other machine learning processing that is recited as being performed by a subsystem of computer system 102 should be understood to also be capable of being executed by one or more components of client device 104.

In some embodiments, object recognition subsystem 114 may extract features from the image (e.g., a received image, a frame from a live image stream, etc.). Features that may be extracted include, but are not limited to, colors, shapes, textures, patterns, edges, corners, blobs, regions of interests, and the like. To extract features, various different feature extraction techniques may be used include, but not limited to, principal component analysis (PCA), independent component analysis (ICA), linear discriminant analysis (LDA), locally linear embedding (LLE), t-distributed stochastic neighbor embedding (t-SNE), and autoencoders (denoising autoencoders, variational autoencoders, convolutional autoencoders, sparse autoencoders). Generally, feature extraction causes raw input data (e.g., image data representing an image (one of the frames) depicting an object) to be transformed into a set of features describing the image, which may be used for modeling. In some embodiments, the feature extraction models used to extract features for a given image may output a vector in a continuous feature space, where each element of the vector has a weight determined by the model for the input image. In some embodiments, the feature extraction model may be a pre-trained model, such as ResNet, AlexNet, GoogLeNet, or VGG-19. Each pre-trained model may be trained based on a large number of training images (e.g., 100,000 or more, 1,000,000 or more, 10,000,000 or more) classified into one of a large number of categories (e.g., 100 or more, 1,000 or more, 10,000 or more).

After features are extracted and a feature vector is generated representing the extracted features, a similarity score may be computed indicating how similar a given image's feature vector is to a feature vector representing features extracted from an image used to train the object recognition model. In some embodiments, a similarity between two images may be determined by computing a distance in an n-dimensional feature space between the feature vector representing an image captured by client device 104 and a feature vector of a corresponding image from the training data set. For example, the distance computed may be a cosine distance, a Minkowski distance, a Euclidean distance, or other metric by which similarity may be computed. In some embodiments, the distance between the two feature vectors may be compared to a threshold distance. If the distance is less than or equal to the threshold distance, then the two images may be classified as being similar, classified as depicting a same or similar object, or both. For example, if a cosine of an angle between the two feature vectors produces a value that is approximately equal to 1 (e.g., $Cos(\theta) \geq 0.75$, $Cos(\theta) \geq 0.8$, $Cos(\theta) \geq 0.85$, $Cos(\theta) \geq 0.9$, $Cos(\theta) \geq 0.95$, $Cos(\theta) \geq 0.99$, etc.), then the two feature vectors may describe similar visual features, and therefore the objects depicted within the images with which the features were extracted from may be classified as being similar.

In some embodiments, search subsystem 116 may be configured to obtain search results related to an input query. The input query may be one or more n-grams (e.g., bi-grams, tri-grams), which may be typed into a search input box of a search system, selected via a click or other invocation, communicated to the search system based on a spoken utterance, or the like. In some embodiments, the input query may be a name or identifier of an object depicted by an image. For instance, after recognizing an object depicted within a live image stream, search subsystem 116 may use the object's name to perform a search for content items related to that name.

In some embodiments, prior to receiving the live image stream from client device 104 and performing object recognition to a frame or frames from the live image stream, search subsystem 116 may be configured to perform an Internet search or multiple searches based on the images included by the training data set used to train the object recognition model utilized by object recognition subsystem 114. As mentioned above, each image from the training data set may have features extracted therefrom, an identifier labeling the image, or any other aspect capable of being used to describe each image from the training data set, or a combination thereof, which may be stored in memory, such as feature database 140. Search subsystem 116 may be configured to retrieve the features, identifiers, or other descriptors related to each image, or the images themselves, and perform an Internet search via one or more search systems (which may be local or third-party search systems) to obtain search results related to each of the training data set's images. For each search performed (e.g., for each of the images of the training data set), the search results may be stored in search result database 142 in association with the particular image, features, identifier, and/or other descriptor, used as the input for that search. For example, a first image from the training data set may have features describing the first image and a first object depicted therein, which may be determined using an object recognition model. The features may be input to the search system using search subsystem 116, and a first set of search results for the first image be obtained. The first set of search results may then be stored in search result database 142 with an indication that the first set of search results was obtained based on the features and/or the first image being used as the search input. Some embodiments may include multiple sets of search results being obtained for each image of the training data set, where each of the sets of search results is obtained by using a different descriptor of the corresponding image as the search input. For example, a first set of search results may be obtained based on a first search performed using a first identifier (e.g., an object name) of an object depicted within a first image as the search input, and a second set of search results may be obtained based on a second search performed using the first image as the search input. The search results that are obtained and stored in search result database 142 may include the URLs of each website determined via a respective search, content items retrieved from the URLs, hyperlinks to each of the URLs, or another type of data object.

Upon an image, such as a frame from of a live image stream, being received and object recognition subsystem 114 determining an identifier (e.g., a name of an object depicted by the image) of the image, search subsystem 116 may be configured to query search result database 142 to retrieve one or more of the search results related to the identifier. As the received image has been determined to match (e.g., have a similarity score exceeding a similarity score threshold) an image from the training data set, the search results previously obtained for the training data set image may be retrieved as representative of search results of the received image. In some embodiments, the search results may then be provided to the user that captured the image via client device 104. For example, the communications network's mobile application running on client device 104 may include computer program instructions indicating how the search results are to be rendered via a UI of the mobile application. Additionally or alternatively, the received image may be used as an input for a search to be performed by a search system, and search subsystem 116 may be configured to perform this search.

In some embodiments, account connection subsystem 118 may be configured to determine which users' accounts on the communications network are connected to one another, facilitate the connecting of two or more user accounts, and/or maintain the connections of various users' accounts of the communications network. Each user may have a registered account on the communications network, and information related to the users and their accounts may be stored within user database 136. For example, a user may register an account with the communications network by completing a registration form and/or by defining a user name (e.g., a pseudonym or other naming scheme) for the user on the communications network. The user name may represent a word, phrase, image, and/or other data that is to be presented to another user when accessing the user's content. In some embodiments, user database 136 may store an identifier (e.g., an author identifier) assigned to each account. User database 136 may further include a list of identifiers assigned to other users' accounts with whom the user is connected. Two users connected to one another may be capable of viewing content provided by one user to the other user via the communications network. For example, a first user may upload an image to the communications network. A second user that is connected to the first user may, upon accessing the communications network, view and/or interact with the image.

Figure 3:
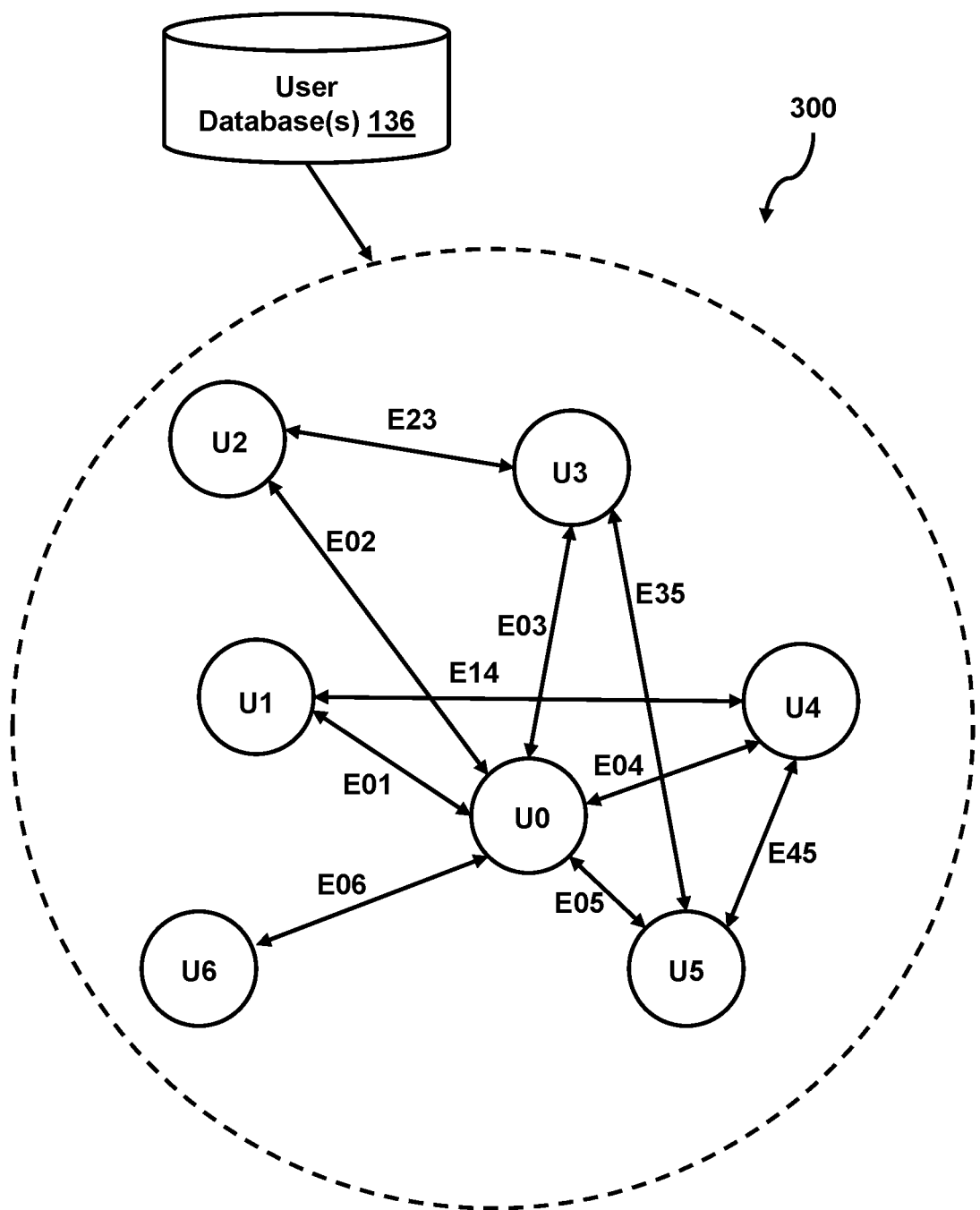
FIG. 3 shows an example of one or more augmented reality visualizations being rendered by a user interface displayed by a client device based on features of an object extracted from a live image stream, in accordance with one or more embodiments.

In some embodiments, user database 136 may store a connection graph associated with each user account that indicates each account identifier, and thus each user, that a given user account is connected to. As an example, with reference to FIG. 3, a connection graph 300 may include a plurality of nodes U0-U6, each associated with a user, connected by edges that may include weights. Connection graph 300 includes edges E01-E06, E 23, E35, E45, and E14. Each edge may indicate the nodes with which it connects (e.g., Edge E02 connects node U0 to node U2). While the edges in connection graph 300 are bidirectional, (some of) the edges may alternatively be unidirectional, indicating a one-way connection between two nodes (e.g., a user that only sends communications to another node, where the other node does not reciprocate communications). The weights may indicate a strength of each connection, such as how closely two nodes are connected to one another. A first user account that frequently interacts with a second user account may have a higher weight attributed to the edge connecting those two nodes within the connection graph when compared with a third user account with whom the first user account does not frequently interact. As an example, a weight of edge E01 may be greater than a weight of edge E06 indicating that the users (e.g., the user accounts on the communications network) corresponding to nodes U0 and U1 have a stronger connection than the users corresponding to nodes U0 and U6.

The weight of an edge may change over time based on interactions of the connecting users. Account connection subsystem 118 may be configured to monitor all interactions between the user accounts of the communications network, and may update the weights based on the interactions. For example, two users that frequently send content items to one another may have their weight increase over time. Similarly, account connection subsystem 118 may be configured to add additional nodes to a connection graph when two user accounts connect with one another. For example, if a new node U7 is added to connection graph 300 in response to a user account of a user associated with node U0 connecting with a new user account, a weight of an edge between these two nodes may be determined and stored in user database 136. Although connection graph 300 is shown as a visual representation of a connection graph, some embodiments may include user database 136 alternatively or additionally storing data representing such a connection graph, and the visual representation may be generated if requested.

Figure 4:
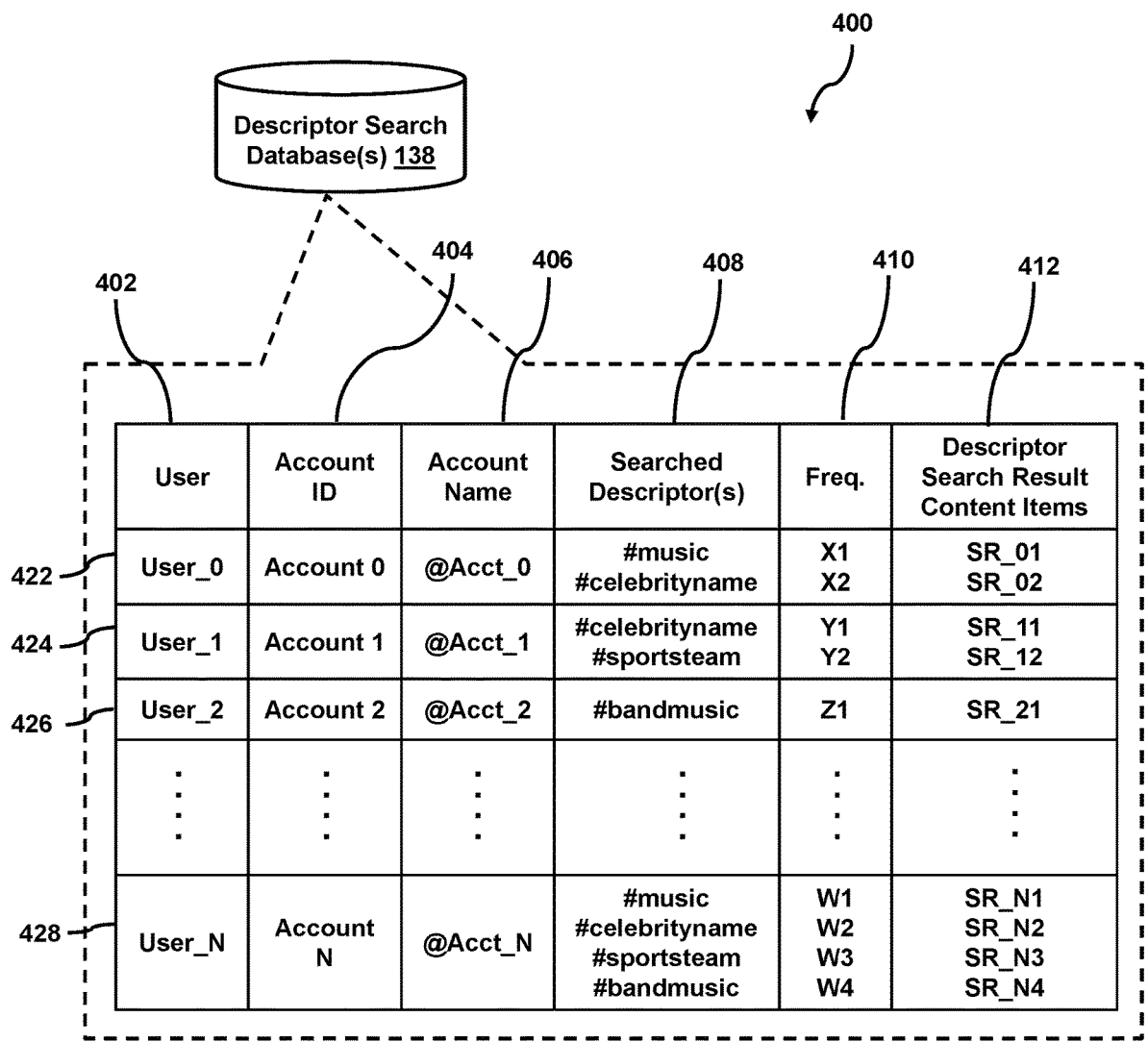
FIG. 4 shows an example of a descriptor search database including stored data indicating previously searched descriptors and accounts that performed the searches, in accordance with one or more embodiments.

In some embodiments, descriptor subsystem 120 may be configured to monitor descriptor searches performed by user accounts of a communications network. Some embodiments include logging each instance of a user searching a particular descriptor on the communications network. The descriptors, the user accounts that searched the descriptor, and the results of descriptor searches, as well as additional information such as a time of the search, location of a client device that performed the search, and the like, may be stored by descriptor search database 138. As an example, with reference to FIG. 4, a table 400 may be stored by descriptor search database 138, which may be populated by descriptor subsystem 120. Table 400 may include a plurality of columns 402-412 and a plurality of rows 422-428. For example, column 402 may indicate users of a communications network, such as User_0, User_1, User_2, . . . , User_N. In some embodiments, each user may have a separate row of the plurality of rows 412-418. When a user registers an account on the communications network, a new row may be added to table 400 for that user. Column 404 may include account identifiers of each user from column 402. For instance, each account listed within column 404 may represent a unique identifier (e.g., an author identifier) that serves to identify the corresponding user on the communications network. Column 406 may include account names associated with each account ID. In some embodiments, the account name may be a word, combination of words, characters, numbers, and the like, which represent the corresponding account ID (and user) on the communications network. For example, users may be identified on the communications network via their corresponding account name. In some embodiments, each account name include a prefix. For example, each account name may include an "at sign" (e.g., "@") preceding the word(s), character(s), number(s), etc., of the account name. The account name may be user generated or the account name may be randomly selected by a random name generator.

Column 408 may include different descriptors searched by a corresponding account identifier. In some embodiments, a user corresponding to an account ID may input a descriptor (e.g., some or all a hashtag), into a query input field of the communications network (e.g., via the communications network's mobile application), and content items, messages, accounts, or other relevant data may be retrieved that is related to the input hashtag. Alternatively, or additionally, a user may select a descriptor associated with a content item (e.g., a hashtag displayed in association with a post on the communications network). For example, a user may click or tap (e.g., via a stylus or finger) a descriptor displayed with a content item posted to the communications network, which may cause the communications network to retrieve other content items that also include the same or similar descriptor. Each searched descriptor may be logged by and stored within descriptor search database 138 with a corresponding account ID that performed the search. For example, row 422 corresponding to an account ID: "Account 0" may have previously searched a first set of descriptors, such as hashtags #music, #celebrityname, as indicated by column 408; row 424 may correspond to an account ID: "Account 1" that previously searched a second set of descriptors, such as hashtags #celebrityname, #sportsteam, as indicated by column 408; row 426 may correspond to an account ID: "Account 2" that previously searched a third set of descriptors, such as hashtag #bandmusic, as indicated by column 408; and row 428 may correspond to an account ID: "Account N" that previously searched a fourth set of descriptors, such as hashtags #music, #celebrityname, #sportsteam, and #bandmusic, as indicated by column 408. Column 410 may include an indication of a frequency with which each descriptor was searched. For example, each instance of a descriptor being searched by on the communications network may increment a counter implemented by descriptor subsystem 120, and a value of the counter may be stored in column 410. As an example, row 422 may indicate that a corresponding user of the account ID: "Account 0" previously searched the first set of descriptors, including hashtag #music X1 times and the hashtag #celebrityname X2 times.

Descriptor subsystem 120 may be further configured to obtain search results for each hashtag searched via the communications network. The search results may include content items, accounts, messages, and the like that include the descriptor. As seen in table 400, column 412 may include search result sets including content items, accounts, messages, etc., including the search descriptor. For example, the hashtag #music, when searched by an account ID: "Account 0" obtained search results SR_01. The same hashtag, when searched by another account ID: "Account N" cause search results SR_N1 to be obtained. Search results SR_01 and SR_N1 may be the same or may differ, depending on the particular user who's corresponding account on the communications network performed the search.

In some embodiments, objects recognized within an image may be mapped to descriptors based on the features extracted from the image. For instance, using an object recognition model, an image may be determined to include a depiction of an object. The object may have a name or identifier associated therewith determined previously from the training data set of images. For example, the received image may be determined to be a picture of a musical group (e.g., "Band") based on an image from the training data set that also depicted the same musical group. Based on information stored in association with the image from the training data set, such as a name of the object (e.g., the name of the musical group, "Band"), a category of the object, or any other information, or any combination thereof, the received image may also be assigned the same or similar information.

In some embodiments, descriptor subsystem 120 may be configured to determine one or more content items, such as posts, on the communications network that include the descriptor related to the object depicted within the live image stream. For example, a post may include a hashtag (e.g., #band, #bandmusic, etc.), and may also include an account identifier of an account on the communications network that generated the post. In some embodiments, a number of views, a number of accounts, a number of shares, or a combination thereof, of that post may be determined and used as criteria for selecting the post or posts from the one or more posts as a content item to be provided to one or more other users (e.g., via an augmented reality visualization of a link to the post or posts).

Figure 5:
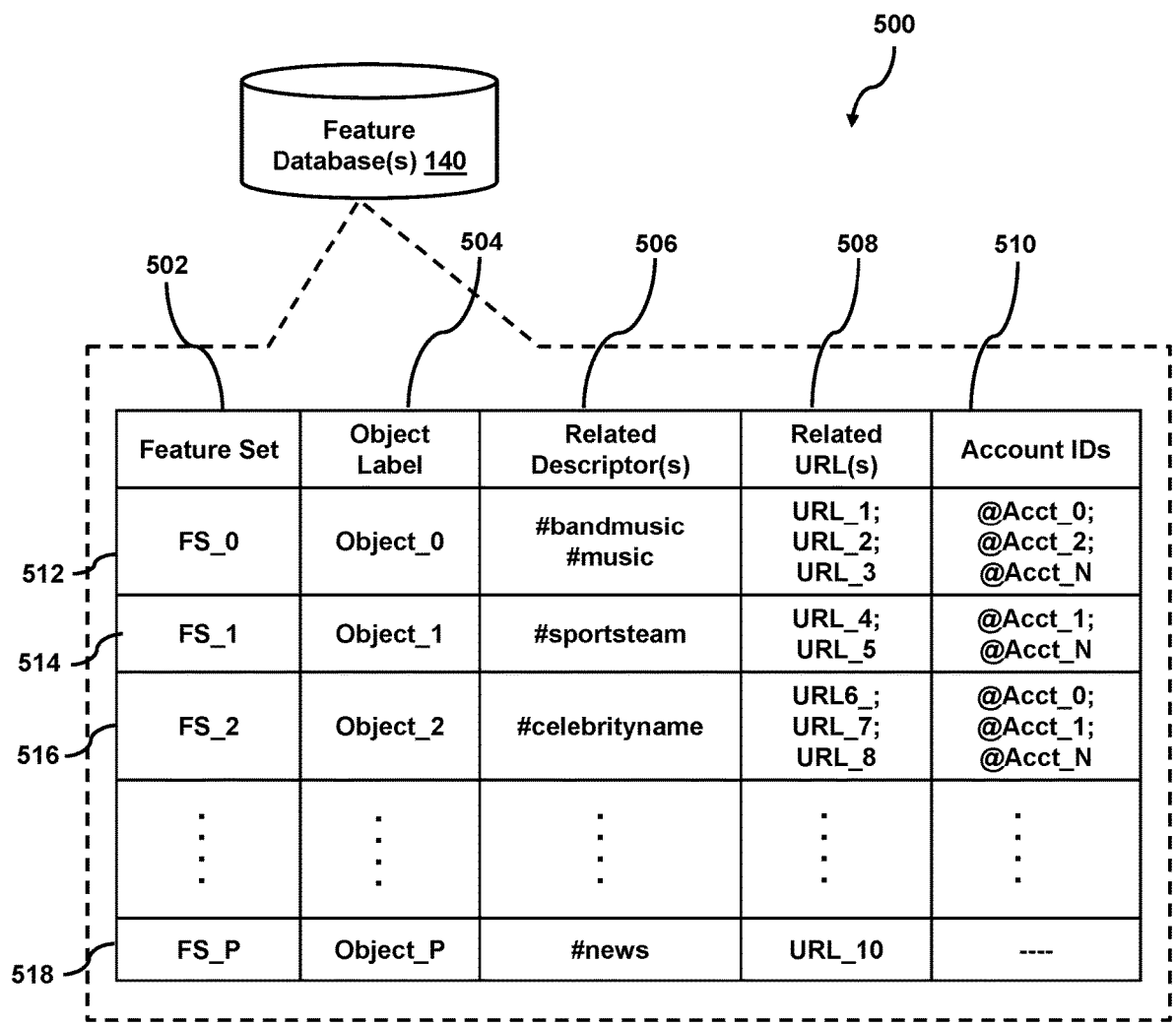
FIG. 5 shows an example of a user database including stored data representing a connection graph of a user, in accordance with one or more embodiments.

Feature database 140 may store features related to a given image, such as an image from the training data set, objects depicted by that image, and other information. In some embodiments, feature database 140 may be populated via content subsystem 112, object recognition subsystem 120, search subsystem 116, account connection subsystem 118, and/or descriptor subsystem 120. As an example, with reference to FIG. 5, a table 500 may be stored by feature database 140, and may include a plurality of columns 502-510 and a plurality of rows 512-518. Each of the plurality of rows 512-518 may relate to a different set of features extracted from an image analyzed by computer system 102, such as images included with a training data set, images from a live image stream (e.g., a frame of a live image stream), or any other image, or any combination thereof. In some embodiments, multiple sets of features may be extracted for a single image, and thus multiple rows of plurality of rows 512-518 may relate to a same image. However, some embodiments may include a single set of features extracted from a given image.

Column 502 may indicate a feature set of an image analyzed by object recognition subsystem 114. For example, row 512 may relate to a feature set FS_0 corresponding to a first image, row 514 may relate to a feature set FS_1 corresponding to a second image, row 516 may relate to a feature set FS_2 corresponding to a third image, and row 518 may relate to a feature set FS_P corresponding to a P-th image. Features that may be extracted include, but are not limited to, colors, shapes, textures, patterns, edges, corners, blobs, regions of interests, and the like. Thus each set of features may include colors, shapes, textures, patterns, edges, corners, blobs, regions of interests, or any other feature, or any combination thereof. In some embodiments, an n-dimensional feature vector describing the set of features in a continuous feature space may also be stored by feature database 140 with the corresponding set of features.

Column 504 may include an indication of an object depicted by an image associated with the set of features listed in column 502. For example, feature set FS_0 may relate to a first image that is determined to depict an object labeled as "Obect_0." In some embodiments, the object label listed in column 504 may be determined based on an object label of an image from a training data set. As mentioned above, an image (e.g., a frame from a live image stream) may be analyzed via a computer vision object recognition model that was trained using a training data set. The object recognition model may determine that a similarity score, which may be computed based on a feature vector representing features extracted from the image, between the image and a first image from the training data set satisfies a similarity condition, indicating that the image and the first image depict a same or similar object. Thus, the object label of the object depicted within the first image may be assigned to the image, indicating that the image also depicts the object.

Column 506 may include descriptors determined to be related to a feature set, and object label, and/or an image. In some embodiments, the object label may be used as an input to determine whether any similar descriptors exist on a communications network. For example, a determination may be made as to whether any similar hashtags exist on a social media network. The similarity between a descriptor and an object label may be determined and if the similarity satisfies a similarity condition (e.g., exceeds or is equal to a similarity threshold), then the object label may be classified as being the same or similar to the descriptor (or descriptors if more than one). Some embodiments may identify a closest word or phrase from an object label to a descriptor based on a Word2Vec model or other model based on embeddings (e.g., BERT, ELMo, or other transformer-based autoencoder with attention) trained on a corpus of text, or some embodiments may determine a continuous-space vector representation and proximity therein with other techniques like latent semantic analysis (LSA). Distances, which may indicate a degree of similarity, between the object label and the descriptor may be determined with various techniques, like cosine distance, Euclidian distance, Minkowski distance, etc. If the distance between the object label and a descriptor satisfies a similarity condition, such as being greater than or equal to a similarity threshold value, then the object label may be classified as including or being related to the descriptor. The related descriptor or descriptors for each object label may be stored in column 506. For example, the object label "Object_0" may be determined to be related to a first group of descriptors, such as hashtags #bandmusic and #music; the object label "Object_1" may be determined to be related to a second group of descriptors, such as hashtag #sportsteam; the object label "Object_2" may be determined to be related to a third group of descriptors, such as hashtag #celebrityname; and the object label "Object_P" may be determined to be related to a fourth group of descriptors, such as hashtag #news.

In some embodiments, a descriptor may be determined to be related to a feature or features based on features extracted from a content item included in a search result set obtained in response to a descriptor search. In some embodiments, a descriptor may be determined to be related to a feature or features based on search results obtained by search subsystem 116. For example, each image of the training data set used to train an object recognition model implemented by object recognition subsystem 114 may have features extracted therefrom via a feature extraction process. In some embodiments, the features may be used as an input to a search system implemented by search subsystem 116 to obtain search results for those features. Additionally or alternatively, the images may be used as input for a search performed by the search system implemented by search subsystem 116 to obtain search results for each of the images. Similarly, descriptor subsystem 120 may be configured to store descriptors previously searched by various user accounts, as well as descriptor search results for those descriptors.

In some embodiments, a determination may be made as to how similar a given descriptor is to one or more search results performed with respect to a given image, such as an image included by a training data set used to train an object recognition model. For example, as mentioned above, features may be extracted from each image of the training data set, and these features, in addition to or instead of the actual image, may be used to perform an Internet search. The search results of the Internet search may include content items, such as websites, documents, images, videos, and the like, each related to the input used for the search (e.g., one or more of the features, the image, etc.). In some embodiments, a similarity metric may be computed between a descriptor used for a search via a communications network and some or all of the search results. For example, words, phrases, images, etc., may be extracted from each search result, and a similarity score may be determined indicating how similar the search result is to the descriptor. As mentioned above, various similarity metrics may be computed to determine whether a search result is similar to a descriptor. Thus, if a search result is determined to be related to a descriptor, the feature set of the content item that yielded the search result may have the descriptor stored in column 506.

Column 508 may include related URLs for each descriptor included in column 506. For example, a hashtag #bandmusic may be related to one or more of URL_1, URL_2, and URL_3. In some embodiments, the related URLs may be directed a webpage of the communications network whereby a content item is accessible. Each descriptor may include one or more content items that have been assigned and/or attributed the descriptor. The related URLs may therefore correspond to a webpage on the communications network where the content item is located such that a user having a user account on the communications network may access (e.g., view, download, annotate, etc.) the content item via the URL.

In some embodiments, the related URLs may be directed to a web site of an item (e.g., a good, service, notice, etc.) that is related to the descriptor. Some embodiments may include performing an Internet search via a search system of search subsystem 116. For example, an object label, descriptor, or an image may serve as an input to the search system, and results of the search may be retrieved and stored in search result database 142. In some embodiments, the URLs of the websites included in the search results for a given image, object label, descriptor, or other input query, may be included in column 508 as related URLs.

Column 510 may include a list of account names that previously performed a search for and/or with a particular descriptor. In some embodiments, column 510 may be populated based on data stored within descriptor search database 138. For example, as seen with respect to row 512, a descriptor, such as the hashtag #bandmusic, may have previously been searched by users of a communications network having account names @Acct_0, @Acct_2, and @Acct_N. As another example, a descriptor, such as the hashtag #news, may not have been searched previously by any account name of the communications network, and thus no account name may be listed in column 510 for that descriptor.

Returning to FIG. 1, content item allocation subsystem 122 may be configured to cause one or more content items to be provided to one or more accounts. For example, with reference to FIG. 2, a user operating client device 104 may capture a live image stream including a depiction of poster 202. In some embodiments, one or more frames from the live image stream depicting poster 202 (e.g., an object) may be analyzed by an object recognition model to determine whether any objects are recognized. If an object is recognized, then content items related to the object may be retrieved from search result database 142. In some embodiments, some or all of the content items may be provided to the user of the client device that captured the live image stream. The content items may be ranked based on relevancy to the object, relevancy to the user's account on the communications network, popularity of each content item (e.g., a number of hits a particular website has received), or other criteria, or a combination thereof. In some embodiments, a top ranked content item, or a top-N ranked content items, may be provided to the user of the client device in response to the live image stream being received (e.g., received by object recognition subsystem 114, an object recognition functionality resident on client device 104, etc.).

Content item allocation subsystem 122 may further be configured to select one or more accounts corresponding to users of a communications network that are connected to an account of a user that the image was received from. In some embodiments, the accounts may be selected based on descriptors previously searched by each of the accounts connected to the user's account on the communications network, as well as, or instead of, the object. For example, based on a connection graph, such as connection graph 300 of FIG. 3, accounts connected to the user's account may be determined. Each account may be ranked based on a weight computed between those accounts' nodes from the connection graph, generating a ranked list of connections for a given user's account.

In some embodiments, descriptors previously searched by each of the accounts of the ranked list may be retrieved from descriptor search database 138. Depending on the object depicted within the image, one or more related descriptors may be identified, as detailed above with respect to FIG. 5, and the related descriptors may be used to determine which accounts connected to the user previously searched those descriptors on the communications network. Content item allocation subsystem 122 may then determine, based on the ranked list of connections, which of those connections' corresponding accounts searched for any of the related descriptors, and a number of searches performed by those accounts for those descriptors, which account or accounts to select to provide with a corresponding content item.

TABLE 1

| Account ID | Ranking | Searched Descriptors | Frequency |
| --- | --- | --- | --- |
| Account 2 | 3 | #bandmusic | Z1 |
| Account N | 20 | #music | W1 |
|  |  | #celebrityname | W2 |
|  |  | #sportsteam | W3 |
|  |  | #bandmusic | W4 |

For example, Table 1 above includes a list of accounts connected to an account of a first user (e.g., Account ID: "Account 0") that captured, via a corresponding client device 104, a live image stream including an image depicting an object (e.g., poster 202). Content item allocation subsystem 122 may obtain an indication of the object recognized within the image, as well as one or more related descriptors of the object, and parse a connection graph (or a portion of a connection graph) related to the user's account to determine which connections that previously searched for any of the related descriptors. As seen from Table 1, if the related descriptors is the hashtag #bandmusic, then users related to account IDs: "Account 2" and "Account N" may identified based on those accounts' previously performed searches for that descriptor.

After identifying which connections previously searched the communications network (or another platform) for the related descriptor, content item allocation subsystem 122 may determine a ranking of each connections' account. For example, the account ID: "Account 2" may have a ranking of 3, indicating that the edge connecting Account ID: "Account 2" and the first user's account (e.g., Account ID: "Account 0") has a third highest weight when compared with all of the other edges connecting nodes from the connection graph. Similarly, the account ID: "Account N" may have a ranking of 20, indicating that the edge connecting Account ID: "Account N" and the first user's account (e.g., Account ID: "Account 0") has the twentieth highest weight when compared with all of the other edges connecting nodes from the connection graph. Thus, "Account 2" may be considered more strongly connected to the first user's account as compared to the "Account N". Furthermore, content item allocation subsystem 122 may determine a frequency with which each account searched the related hashtag. As seen from Table 1, "Account 2" previously searched a descriptor, such as the hashtag #bandmusic, Z1 times, while "Account N" previously searched the same descriptor W4 times.

Content item allocation subsystem 122 may select one or more of the identified accounts based on each accounts' ranking and frequency of previous searches for the descriptor. In some embodiments, content item allocation subsystem 122 may determine an account score for each account based on a weighted combination of an account's ranking and the frequency of the previous searches for the related descriptor. For example, Equation 1 may be used to compute the score:

$$\text{Account Score}_i = A_i R + B_i F \quad \text{Equation 1.}$$

As seen from Equation 1, the account score for an i-th account may be a linear combination of the i-th account's rank R and frequency F, where rank R and frequency F are weighted by coefficients $A_i$ and $B_i$, respectively. In some embodiments, $A_i$ and $B_i$ may be selected based on historical data indicating whether users tend to provide content items to others with whom they are more strongly connected or who may have a greater interest in the content items. As an example, $A_i$ and may have values 0.75 and 0.25, respectively, however any other value between the ranges of 0 and 1 for either coefficient may be selected. Furthermore, in some embodiments, the rank and frequency of each account may be normalized with respect to the other user accounts of the connection graph.

In some embodiments, the account score for each account may be computed and a determination may be made as to whether the account score satisfied an account score condition. For example, if an account score was equal to or greater than a predefined account score threshold, then the corresponding account or accounts may be selected and provided with the content item or items related to the object depicted within the received image. In some embodiments, accounts corresponding to the top N account scores may be selected and provided with the content items.

In some embodiments, AR visualization subsystem 124 may be configured to generate and provide augmented reality visualizations to a client device 104 of the selected content item(s) that is/are to be provided to the selected user accounts. In some embodiments, an AR visualization may a refer to a data object rendered on a UI whereby the data object is overlaid onto a layer of the UI such that the data object and the UI appears to exist in a virtual three-dimensional space. Furthermore, some embodiments include the AR visualization being a dynamic link to a content item, website, message, user account, or other resource such that when a user interacts with the AR visualization (e.g., clicks on, taps, long-presses, etc.), the user is provided with the content item, website, message, user account, or other resource. For example, an AR visualization may be overlaid on a user interface displayed on a display screen of a client device (e.g., client device 104). If or when a user interacts with the AR visualization, such as by clicking, tapping, long-pressing, or performing any other selection action, an API of an application running on the client device may access a website with which the link is directed to and cause the website's content to be rendered by the user interface.

Figure 6:
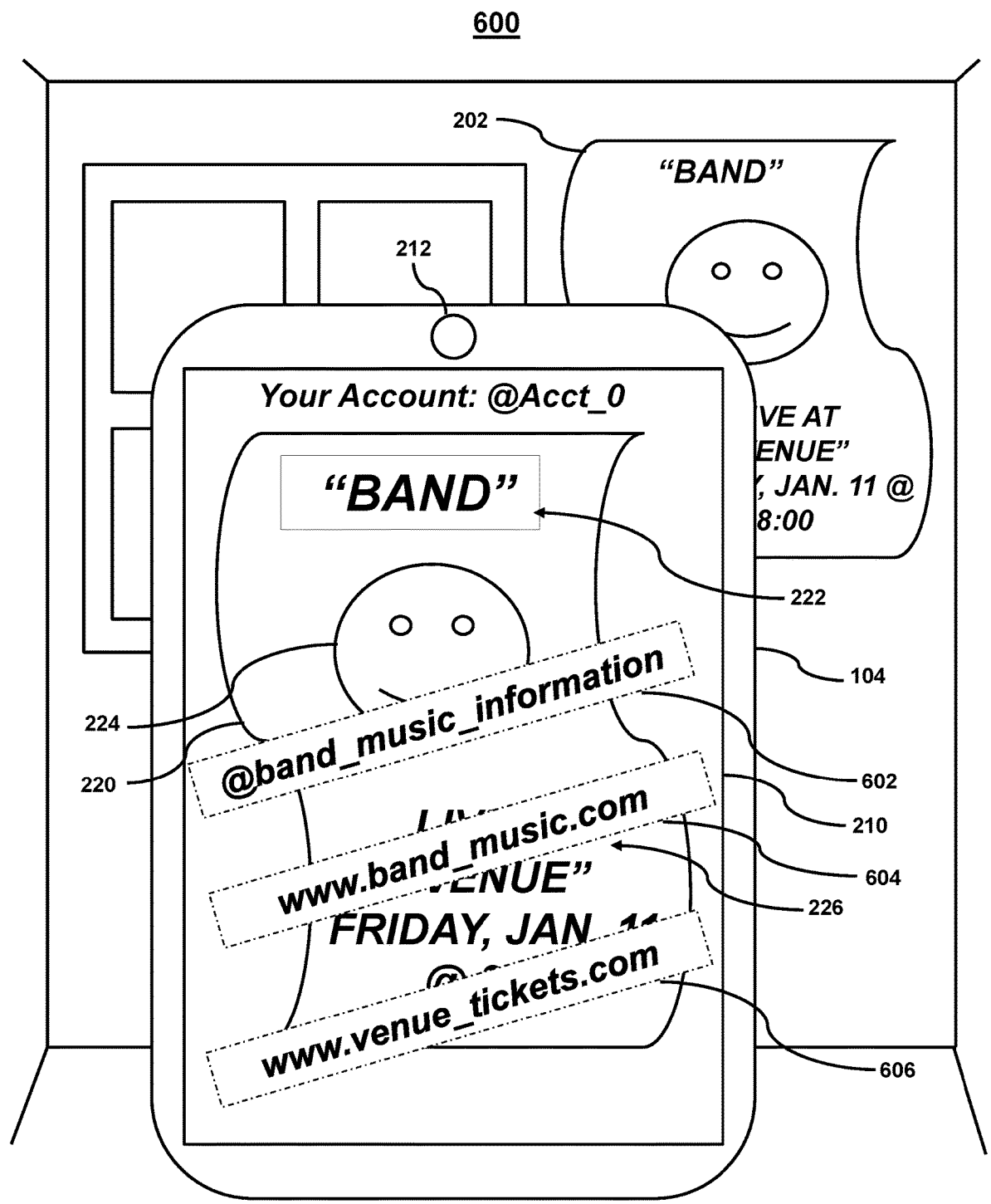
FIG. 6 shows an example of a feature database including stored data indicating relationships between features, descriptors, webpages, and accounts, in accordance with one or more embodiments.

As an example, with reference to FIG. 6, AR visualizations 602, 604, and 606 may be rendered on UI 210, displayed by client device 104. Each of AR visualizations may correspond to a type of dynamic link that is directed to a website, a content item, a user account, a message, a mobile application, a product, a service, or any other item, or any combination thereof. Furthermore, each dynamic link may be selected based on an object determined to be depicted within an image. For example, as mentioned above, as client device 104 captures a live image stream of poster 202, a representation of the live image stream may be rendered on UI 210. In some embodiments, poster rendering 220 may represent poster 202 rendered on UI 210 and may visually depict poster 202 displayed within a scene 600, including text items 222 and 226 and image item 224. As an example, poster 202 may be a poster of an event where a particular musician or musical group performed. Poster 202 may include information indicating the name of the musician or musical group, information regarding the event (e.g., a name of the venue where the event occurred, a date and/or time of the event, etc.), as well as a picture of the musician or musical group. Poster rendering 220 may similarly depict the same information from poster 202 including, for example, text items 222 and 226 and image item 224.

Object recognition subsystem 114 may determine, based on one or more frames from the live image stream, that the live image stream includes a depiction of poster 202. In some embodiments, an object recognition model may extract features from the images of the live image stream and determined an object depicted within the images based on the features. For example, a determination may be made that the object depicted within the live image stream is a poster related to a band (e.g., "Band"). Based on that determination, search subsystem 116 may obtain search results related to a label or identifier of the object. In some embodiments, the search results may include links to websites related to the object, and AR visualization subsystem 124 may generate an AR visualization of the link and cause the AR visualization of the link to be provided to a client device 104. For example, AR visualization 602-606 may be displayed on UI 210 of client device 104, which may correspond to the client device that captured the live image stream of poster 202.

In some embodiments, the search results may also indicate accounts on a communications network that are related to the object. For example, as mentioned above, because the object depicted within the images was determined to be a poster related to a band (e.g., "Band"), an account name (e.g., "@band_music_information") on the communications network associated with this entity may be identified by the search results. AR Visualization subsystem 124 may generate an AR visualization 602 of the account name, which may be provided to client device 104 and rendered within UI 210. In some embodiments, AR visualizations 602, 604, and 606 may be displayed as an overlay with respect to the live image stream from UI 210. In this way, a user operating client device 104 may select one of AR visualizations 602, 604, and/or 606, and be automatically directed to a corresponding account on the communications network or website. For example, if a user taps on AR visualization 606, the user may be directed to a website where tickets for a concert of the band (e.g., "Band") depicted by poster 202 can be purchased.

Figure 7:
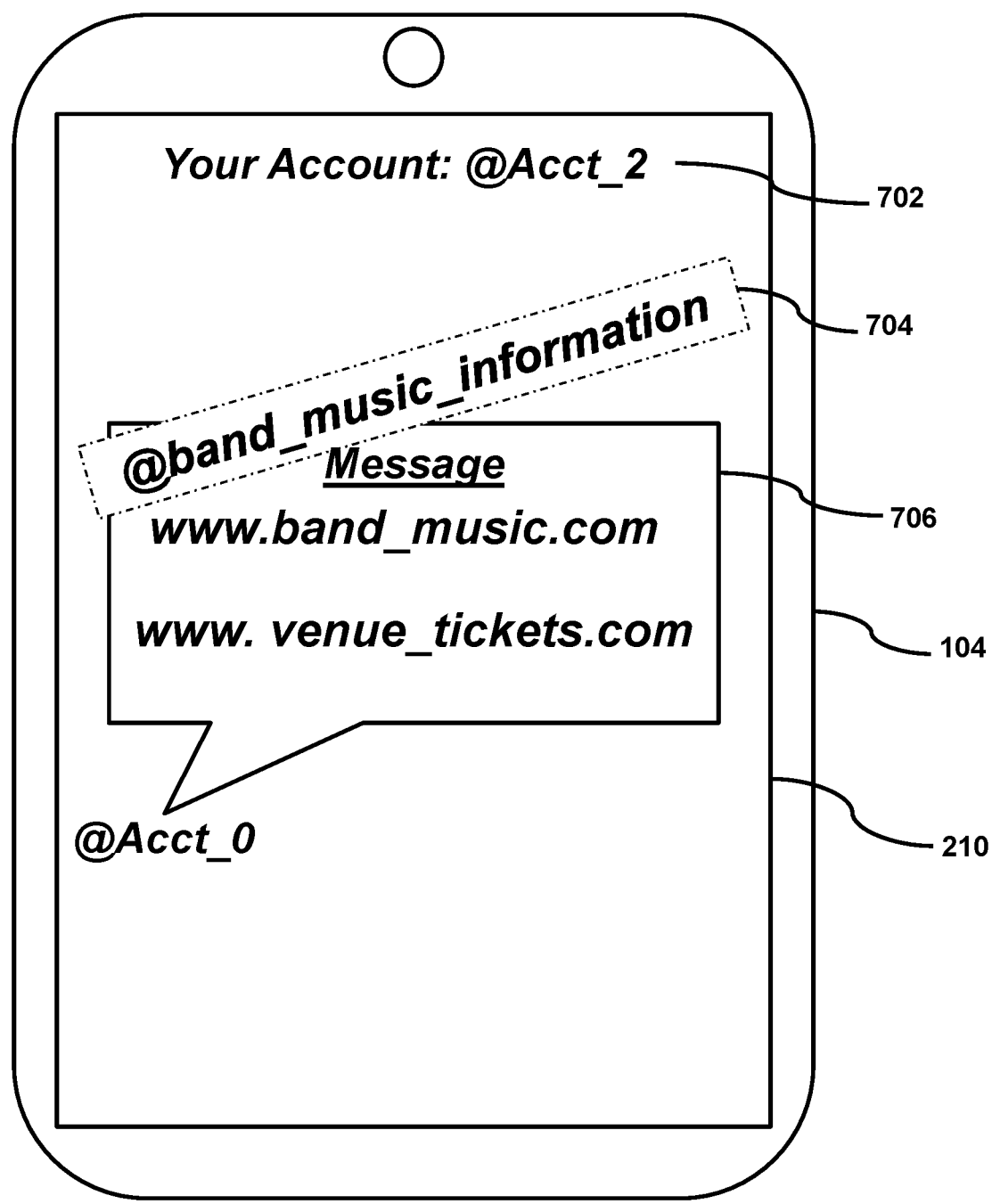
FIG. 7 shows an example of a client device configured to display a user interface of a communications network including an augmented reality visualization overlaid on content, in accordance with one or more embodiments.

In some embodiments, in addition to or instead of providing AR visualizations to a user of a client device that captured the live image stream, one or more connections of the user's account on the communications network may be provided with some or all of the AR visualizations. For example, with reference to FIG. 7, a client device 104 associated with a user having an account on the communications network, having an account name 702 (e.g., @Acct_2), may display UI 210. UI 210 may be another instance of a UI for the communications network, and each account of the communications network may have an instance of the communications network's UI rendered by their respective client device 104. In some embodiments, the account having account name 702 may be selected as a recipient for AR visualization 704 based on previous descriptors searched by the user's account as well as the user's connection to another user that facilitated the AR visualization being provided thereto. For example, the user account having account name @Acct_2 may be connected to another account on the communications network, the other account corresponding to the account name @Acct_0. In some embodiment, account connection subsystem 118 may determine, based on a connection graph associated with a first user who captured a live image stream (e.g., a live image stream depicting poster 202 of FIG. 2), that the a second user, whose account on the communications network is user name @Acct_2, being connected to the first user. Furthermore, descriptor subsystem 120 may determine that the user account having user name @Acct_2 previously search for a descriptor related to an object depicted within the live image stream (e.g., "Band"). Based on the first user and the second user being connected to one another, and the second user's previous descriptor search activity, content item allocation subsystem 122 may select the second user's account for receiving content items related to the object depicted within the live image stream. AR visualization subsystem 124 may be configured to generate AR visualization 704 and cause AR visualization 704 to be provided to client device 104 operated by the second user. In some embodiments, AR visualization subsystem 124 may cause AR visualization 704 to be displayed to the second user via UI 210, including causing AR visualization 704 to be overlaid on the content currently being rendered by UI 210. For example, UI 210 may render a message 706 from the first user (e.g., the user having user account name @Acct_0), and AR visualization 704 may be overlaid on top of message 706.

In some embodiments, a determination may be made as to whether a user has interacted with a link provided to an account. For example, an event handler associated with link (e.g., an AR visualization of the link) may trigger an action to be performed in response to detecting a particular event. The event may include a determination that an interaction with AR visualization has occurred via the UI displayed by client device 104. The different types of events may include, but are not limited to, clicks, taps, long presses, swipes, scrolling actions, hovering actions, eye gazes, gestures, voice commands, and the like. As the AR visualization includes a dynamic link to the website, the event handler may be implemented by a local Javascript of the communications network's mobile application executing on client device 104 such that, if a particular event, such as one of the aforementioned events, is detected, then a predetermined action in response is performed. The predetermined action may include opening a web browser locally on client device 104, inputting the URL indicated by the dynamic link, and causing the website corresponding to the URL to be rendered by the web browser. In some embodiments, the predetermined action may include causing the communications network's mobile application to facilitate an action, such as directing the UI to display content related to a particular user account on the communications network. For example, in response to detecting that a user has interacted with AR visualization 602, which includes a dynamic link to a particular user account (e.g., @band_music_information) on the communications network, the communications network may direct the UI to display content related to that user account. In some embodiments, each detected interaction with the AR visualization may be logged and stored by content database 134 along with an account ID of the user account on the communications network with which such an interaction was detected.

In some embodiments, the link, and thus the AR visualization generated based on the link, may be provided to a user account in response to determining that another account has interacted with the AR visualization. For example, in response to determining that a user operating client device 104 of FIG. 6 interacted with AR visualization 602, a same or similar AR visualization (e.g., account name 702) may be provided to an account of a selected user (e.g., the user associated with account name @Acct_2). In this way, an immediate provision of relevant content may be provided to a select user or select set of users connected to a first user based on those select users prior activity on the communications network (e.g., previous descriptor searches), connections to the first user, and the first user selecting or otherwise interacting with the dynamic link.

Example Flowcharts

Figure 8:
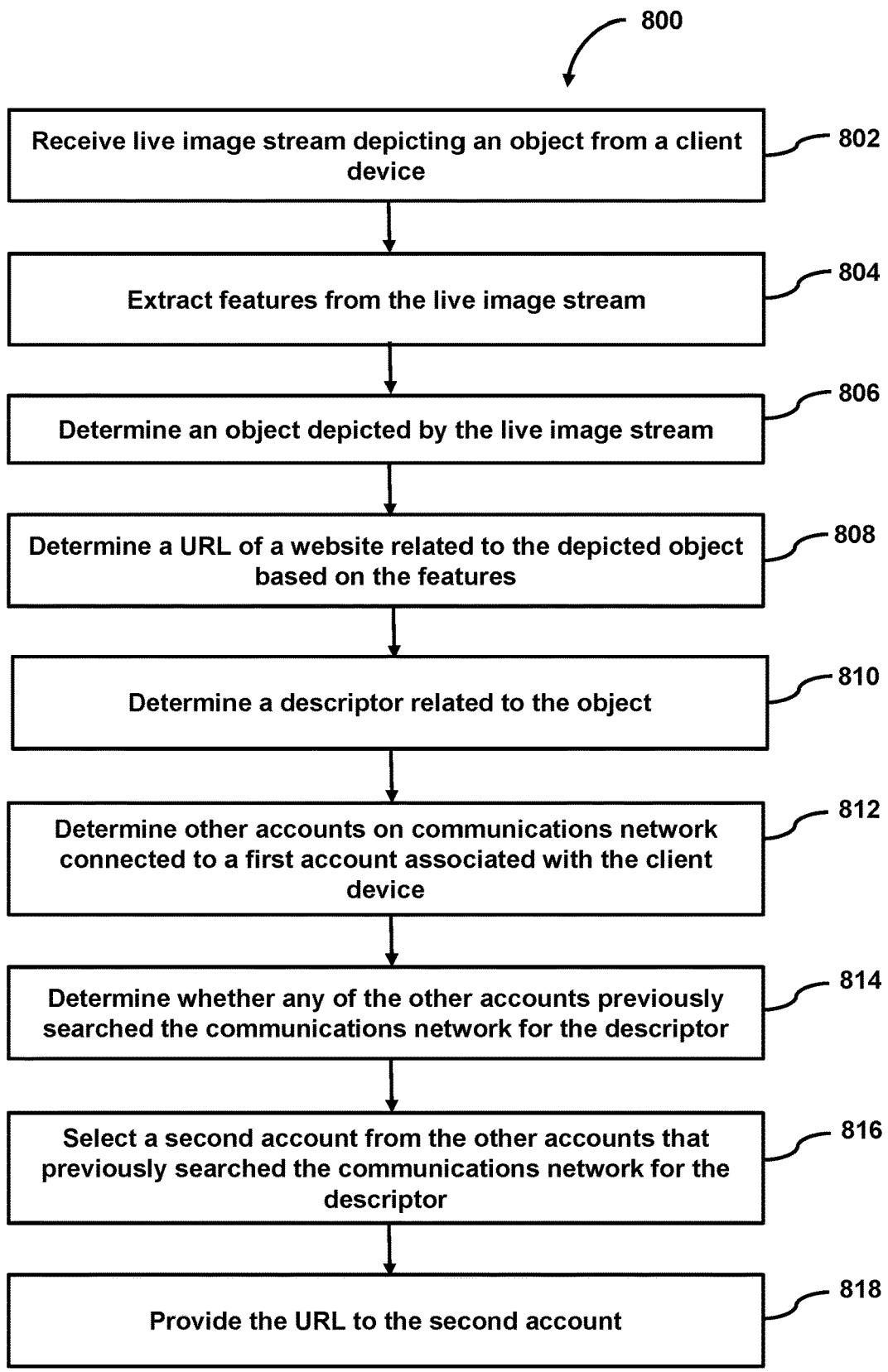
FIG. 8 shows a flowchart of an example method of providing a content item to a connected account based on features of an object extracted from a live image stream, in accordance with one or more embodiments.
Figure 9:
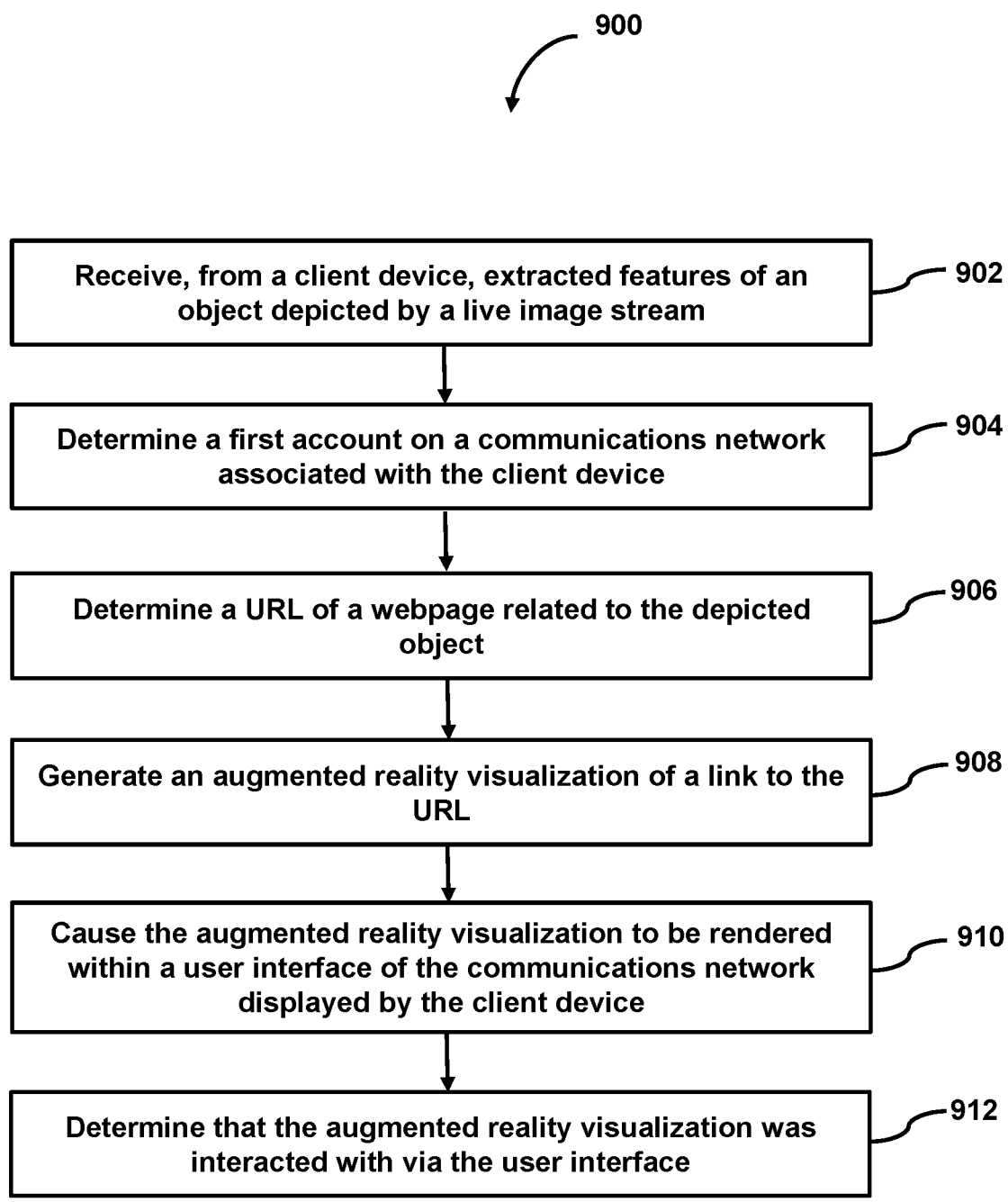
FIG. 9 shows a flowchart of an example method of providing an augmented reality visualization of a link to a webpage related to an object depicted within a live image stream, in accordance with one or more embodiments.

FIGS. 8 and 9 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 8 shows a flowchart of an example method 800 of providing a content item to a connected account based on features of an object extracted from a live image stream, in accordance with one or more embodiments. In an operation 802, a live image stream depicting an object may be received from a client device. For example, a live image stream depicting poster 202 may be received by computer system 102 from a client device 104 capturing the live image stream. The live image stream may be provided to computer system 102 over network(s) 150, and may include an indication of the client device (e.g., client device 104) that the live image stream as received from. For example, a device identifier, user agent string, IP address, and the like may be sent to computer system 102 with the live image stream. In some embodiments, the live image stream may be captured by a user operating client device 104 while using a communications network's mobile application executing on client device 104. The user may have an account on the communications network and the live image stream may be sent to computer system 102 with an indication of the user's account (e.g., an account ID, an account name, etc.). In some embodiments, an image, set of images, and/or video, may be received instead of the live image stream. In some embodiments, operation 802 may be performed by a subsystem that is the same or similar to content subsystem 112, object recognition subsystem 114, or content subsystem 112 and object recognition subsystem 114.

In an operation 804, features may be extracted from the live image stream. In some embodiments, the live image stream may be analyzed on a frame by frame basis, or via any other live image streaming parsing technique, and at least some of the frames may be input to a pre-trained object recognition model. The object recognition model may extract features of the images, which may be used for determining whether an object is recognized within any of the images of the live image stream. In some embodiments, the object recognition model may include feature extraction processing to extract features from an input image. Features that may be extracted include, but are not limited to, colors, shapes, textures, patterns, edges, corners, blobs, regions of interests, and the like. Various different feature extraction techniques may be used include, but not limited to, principal component analysis (PCA), independent component analysis (ICA), linear discriminant analysis (LDA), locally linear embedding (LLE), t-distributed stochastic neighbor embedding (t-SNE), and autoencoders (denoising autoencoders, variational autoencoders, convolutional autoencoders, sparse autoencoders). In some embodiments, a feature vector representing the extracted features may be generated. The feature vector may be an n-dimensional feature vector in a continuous vector space, which may be used to determine how similar the image is to other images previously mapped to the continuous vector space. In some embodiments, operation 804 may be performed by a subsystem that is the same or similar to object recognition subsystem 114.

In an operation 806, an object depicted by the live image stream may be determined. In some embodiments, the feature vector generated based on the features extracted by the feature extraction process may be compared with other feature vectors corresponding to images from a training data set used to train the object recognition model. A similarity score may be computed based on the feature vector generated based on the extracted features and the feature vectors of the images from the training data set. The similarity score may be computed based on a distance metric indicating a distance between the two feature vectors in a feature space. In some embodiments, the distance computed may be a cosine distance, a Minkowski distance, a Euclidean distance, or other metric by which similarity may be computed. The distance between the two feature vectors may be compared to a threshold distance, and if the distance is less than or equal to the threshold distance, then the two images may be classified as being similar, classified as depicting a same or similar object, or both. For example, if a cosine of an angle between the two feature vectors produces a value that is approximately equal to 1 (e.g., $\cos(\theta) \geq 0.75$, $\cos(\theta) \geq 0.8$, $\cos(\theta) \geq 0.85$, $\cos(\theta) \geq 0.9$, $\cos(\theta) \geq 0.95$, $\cos(\theta) \geq 0.99$, etc.), then the two feature vectors may describe similar visual features, and therefore the objects depicted within the images with which the features were extracted from may be classified as being similar. In some embodiments, operation 806 may be performed by a subsystem that is the same or similar to object recognition subsystem 114.

In an operation 808, a URL of a website related to the depicted object may be determined based on the features. In some embodiments, each of the images from the training data set may be analyzed and used to obtain search results indicating websites, images, accounts, or other content items that are related to the object or objects depicted within a corresponding image. If the object depicted within an image (e.g., an image from a live image stream) is determined to be similar to one of the images from the training data set, then the previously obtained search results obtained based on the image from the training data set may be retrieved from search result database 142. In some embodiments, a most-frequently-interacted-with search result may be determined. For example, a website having the greatest number of visits, a trending website, and/or a website determined to be most relevant to a particular context (e.g., a user profile) may be determined. The URL of the website may then be extracted from the search result as a corresponding link related to the object depicted by the live image stream. In some embodiments, the features extracted from the image (e.g., a frame or frames from the live image stream) may be used as an input for performing a search using an Internet searching system, and the search results obtained in response to the search may be analyzed to determine a website or website that is most relevant to the features, and the website's URL may be extracted. In some embodiments, operation 808 may be performed by a subsystem that is the same or similar to object recognition subsystem 114, search subsystem 116, or a combination of object recognition subsystem 114 and search subsystem 116.

In an operation 810, a descriptor related to the object may be determined. In some embodiments, the object determined to depicted within the live image stream may correspond to an image from a training data set. The image from the training data set, which may also depict the image, may include an object label (e.g., an object name, an object type, etc.) or other description information associated with the object. Some embodiments include determining related descriptors based on the object label, such as by performing a descriptor search on a communications network for descriptors using the object label as an input query. A most popular, most relevant, or most similar (e.g., with respect to the object label) N-descriptors may be selected to be the descriptors hashtags related to the object. Similarity between a descriptor and an object may be computed by calculating a similarity score between a character string of the descriptor and a character string of the object label. For example, a Word2Vec model may be used to compute a distance between a feature vector of the character string of a hashtag and a feature vector of the character string of the object label. A distance that satisfies a distance threshold (e.g., being less than or equal to a predetermined distance) may be classified as being similar. In some embodiments, descriptors related to the object may be determined by extracting an object name, object type, or other characteristics of the object, from the URL of the webpage related to the object. For example, an object name, such as a product name, may be extracted from the URL. Descriptors related to the extracted object name may be determined by performing a descriptor search on the communications network, where one or more descriptors related to the object name may be obtained. A similarity between each of the descriptors and the object name to determine a top N most relevant, popular, and/or similar descriptors, for example using a Word2Vec model as described above. In some embodiments, operation 810 may be performed by a subsystem that is the same or similar to object recognition subsystem 114, descriptor subsystem 120, or a combination of both object recognition subsystem 114 and descriptor subsystem 120.

In an operation 812, other accounts on the communications network that are connected to a first account of a user operating the client device may be determined. Some embodiments may include obtaining or accessing a connection graph of, or a portion of a connection graph related to, a user account. For example, a connection graph of a user account of a user associated client device 104 may be obtained from user database 136. Based on the connection graph or information describing the connection graph, one or more nodes, each of which corresponds to a user account on the communications network, may be selected that are connected to a node of the user account of the user associated with client device 104. The nodes may be selected based on a weight of an edge connecting a corresponding node to the node of the user account. In some embodiments, operation 812 may be performed by a subsystem that is the same or similar to account connection subsystem 118, descriptor subsystem 120, or a combination of both account connection subsystem 118 and descriptor subsystem 120.

In an operation 814, a determination may be made as to whether any of the other accounts on the communications network (that are determined to be connected to the first account) previously searched the communications network for the descriptor. Some embodiments include searching descriptor search database 138 to determine user accounts that have searched the descriptor related to the object, or another descriptor that is similar to the descriptor related to the object. For example, descriptor search database 138 may store an indication of each hashtag search on a social media network, or via an Internet search, user accounts of the social media network that performed the descriptor search, a number of instances of each user account performing the same or similar descriptor search, or any other information, or a combination thereof. In some embodiments, operation 814 may be performed by a subsystem that is the same or similar to account connection subsystem 118, descriptor subsystem 120, or a combination of both account connection subsystem 118 and descriptor subsystem 120.

In an operation 816, a second account may be selected from the other accounts on the communications network that are connected to the first user account and that previously searched the communications network for the descriptor. In some embodiments, the second account may be selected based on a connection strength between the second account and the first account, the number of instances that the second account (and any of the other accounts) performed a search for a descriptor that is the same or similar to the descriptor determined to be related to the object, or any other criteria for selecting an account (e.g., previous communications between accounts, geographical proximity to client devices of the accounts' users, etc.), or any combination thereof. In some embodiments, an account score may be computed for each of the other accounts. If one or more of the account scores satisfies an account score condition (e.g., an account score being equal to or greater than a predefined account score threshold), then the corresponding account or accounts may be selected. In some embodiments, operation 814 may be performed by a subsystem that is the same or similar to account connection subsystem 118, descriptor subsystem 120, content item allocation subsystem 122, or a combination thereof.

In an operation 818, the URL of the webpage related to the depicted object may be provided to the second account. Some embodiments may include providing a link (e.g., a dynamic link) to the webpage to a client device 104 of a user associated with the second account. For example, the link may be provided via an SMS message, an email, a post to the communications website, and the like. Some embodiments include generating an AR visualization of the link, which may then be provided to client device 104 of the user associated with the second account. For example, an AR visualization of the link may be overlaid on top of content items being rendered by a UI of the communications network being displayed by client device 104. In some embodiments, operation 810 may be performed by a subsystem that is the same or similar to content item allocation subsystem 122, AR visualization subsystem 124, or a combination of content item allocation subsystem 122 and AR visualization subsystem 124.

FIG. 9 shows a flowchart of an example method 900 providing an augmented reality visualization of a link to a webpage related to an object depicted within a live image stream, in accordance with one or more embodiments. In an operation 902, extracted features of an object depicted by a live image stream may be received from a client device. In some embodiments, features may be extracted from an images or images of the live image stream based on an object recognition model executing via computer program instructions located on a client device 104. For example, an object recognition model structured to execute on a client device may be integrated with the functionalities of a communications network's mobile application such that live image streams may be analyzed to determine whether any objects are recognized. In some embodiments, the object recognition model may be generated using a neural network architecture that runs efficiently on mobile computing devices (e.g., smart phones, tablet computing devices, etc.). Some examples of such neural networks include, but are not limited to MobileNet-v1, MobileNet-v2, MobileNet-v3, ResNet, NASNet, EfficientNet, and others. With these neural networks, convolutional layers may be replaced by depthwise separable convolutions. For example, the depthwise separable convolution block includes a depthwise convolution layer to filter an input, followed by a pointwise (e.g., 1×1) convolution layer that combines the filtered values to obtain new features. The result is similar to that of a conventional convolutional layer but faster and more compatible with the processing and memory characteristics of client device 104. Generally, neural networks running on mobile computing devices (e.g., client devices 104) include a stack or stacks of residual blocks. Each residual block may include an expansion layer, a filter layer, and a compression layer. With MobileNet-v2, three convolutional layers are included: a 1×1 convolution layer, a 3×3 depthwise convolution layer, and another 1×1 convolution layer. The first 1×1 convolution layer may be the expansion layer and operates to expand the number of channels in the data prior to the depthwise convolution, and is tuned with an expansion factor that determines an extent of the expansion and thus the number of channels to be output. In some examples, the expansion factor may be six, however the particular value may vary depending on the system. The second 1×1 convolution layer, the compression layer, may reduce the number of channels, and thus the amount of data, through the network. Upon extracting the features from the live image stream, client device 104 may provide the extracted features to computer system 102. In some embodiments, the extracted features may be used to determine an object depicted within the live image stream based on a training data set used to train the object recognition model executed by client device 104. The recognized object, an object label describing the object, or any other information used to identify the object depicted within the live image stream may be provided to computer system 102 in addition to, or instead of, the extracted features. In some embodiments, operation 902 may be performed by a subsystem that is the same or similar to object recognition subsystem 114.

In an operation 904, a first account on a communications network associated with the client device may be determined. In some embodiments, the extracted features and/or other object identification information (e.g., an object label of an object depicted by the live image stream captured by client device 104) may be received by computer system 102 with metadata indicating an account associated with the client device. For example, the metadata may include a device identifier, a user agent string, an IP address, a MAC address, and the like, which may be used by computer system 102 to determine a related user account on the communications network. As another example, the metadata may indicate an account identifier of a user of the communications network. For instance, the object recognition model used to extract features from the live image stream and/or recognize the object (or objects) depicted by the live image stream may be integrated within a mobile application of the communications network executing on client device 104. Upon extracting the features and/or recognizing the object depicted within the live image stream, the features and/or object identification information may be provided to computer system 102 along with the account ID of the user account on the communications network associated with a user of client device 104. In some embodiments, operation 904 may be performed by a subsystem that is the same or similar to object recognition subsystem 114.

In an operation 906, a URL of a webpage related to thee depicted object may be determined. In some embodiments, if the object depicted within the live image stream is determined to be similar to one of the images from the training data set, then previously obtained search results associated with those images from the training data set may be retrieved from search result database 142. The URL of the website may then be extracted from the search result as a corresponding link related to the object depicted by the live image stream. In some embodiments, operation 906 may be similar to operation 808 of FIG. 8, and the previous description may apply. In some embodiments, operation 906 may be performed by a subsystem that is the same or similar to search subsystem 116.

In some embodiments, one or more operations from method 800 may also be performed in addition to operations 902-906. For instance, prior to, after, or in parallel to performance of operations 902-906, operations 810-816 may be performed. As an example, after operation 906 is performed, operations 810 and 812 may be performed to determine a descriptor (e.g., a hashtag) related to the object and other accounts on the communications network that may be determined are connected to the first account.

In an operation 908, an augmented reality visualization of a link to the URL may be generated. In some embodiments, the AR visualization of the link may include a graphical depiction of the link, which may be a dynamic link, that is to be rendered on a UI. The AR visualization may be a GUI displayed on a display screen such that, if interacted with (e.g., clicked, tapped, long-pressed, etc.), may cause a web browser of a client device to access the URL of the link. In some embodiments, the AR visualization may be a 3D visualization such that the dynamic link appears to have three-spatial dimensions when viewed by a user on client device 104. In some embodiments, operation 908 may be performed by a subsystem that is the same or similar to AR visualization subsystem 124.

In an operation 910, the AR visualization may be caused to be rendered within a UI of the communications network displayed by the client device. For instance, the AR visualization may be rendered within a UI of the communications network's mobile application executing on client device 104. In some embodiments, the AR visualization may be overlaid on content rendered by the UI of the communications network's mobile application such that some or all of the content may be visible while the AR visualization is displayed. For example, with reference to FIG. 6, AR visualizations 602-606 may be overlaid on UI 210 displayed by client device 104. In some embodiments, operation 910 may be performed by a subsystem that is the same or similar to content item allocation subsystem 122, AR visualization subsystem 124, or a combination of both content item allocation subsystem 122 and AR visualization subsystem 124.

In an operation 912, a determination may be made that a user interacted with the AR visualization via the UI. For example, an event handler associated with the AR visualization may trigger an action to be performed in response to detecting a particular event. The event may include a determination that an interaction with AR visualization has occurred via the UI displayed by client device 104. The different types of events may include, but are not limited to, clicks, taps, long presses, swipes, scrolling actions, hovering actions, eye gazes, gestures, voice commands, and the like. As the AR visualization include a dynamic link to the website, the event handler may be implemented by a local Javascript of the communications network's mobile application executing on client device 104 such that, if a particular event, such as one of the aforementioned events, is detected, then a predetermined action in response is performed. The predetermined action may include opening a web browser locally on client device 104, inputting the URL indicated by the dynamic link, and causing the website corresponding to the URL to be rendered by the web browser. In some embodiments, the predetermined action may include causing the communications network's mobile application to facilitate an action, such as directing the UI to display content related to a particular user account on the communications network. For example, in response to detecting a user has interacted with that AR visualization 602, which includes a dynamic link to a particular user account (e.g., @band_music_information) on the communications network, the communications network may direct the UI to display content related to that user account. In some embodiments, each detected interaction with the AR visualization may be logged and stored by content database 134 along with an account ID of the user account on the communications network with which such an interaction was detected. In some embodiments, operation 912 may be performed by a subsystem that is the same or similar to content subsystem 112, AR visualization subsystem 124, or a combination of both content subsystem 112 and AR visualization subsystem 124.

In some embodiments, the various computers and subsystems illustrated in FIG. 1 may include one or more computing devices that are programmed to perform the functions described herein. The computing devices may include one or more electronic storages (e.g., database(s) 132, which may include content database 134, user database 136, descriptor search database 138, feature database 140, search result database 142, etc., or other electronic storages), one or more physical processors programmed with one or more computer program instructions, and/or other components. In some embodiments, each of the databases described above in connection with database(s) 132 may include one or more instances of that particular database, and the databases may be organized as distributed databases or the databases may be co-located. The computing devices may include communication lines or ports to enable the exchange of information with one or more networks 150 (e.g., the Internet, an Intranet, etc.) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-124 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-124 described herein is for illustrative purposes, and is not intended to be limiting, as any of subsystems 112-124 may provide more or less functionality than is described. For example, one or more of subsystems 112-124 may be eliminated, and some or all of its functionality may be provided by other ones of subsystems 112-124. As another example, additional subsystems may be programmed to perform some, or all of the functionality attributed herein to one of subsystems 112-124.

Figure 10:
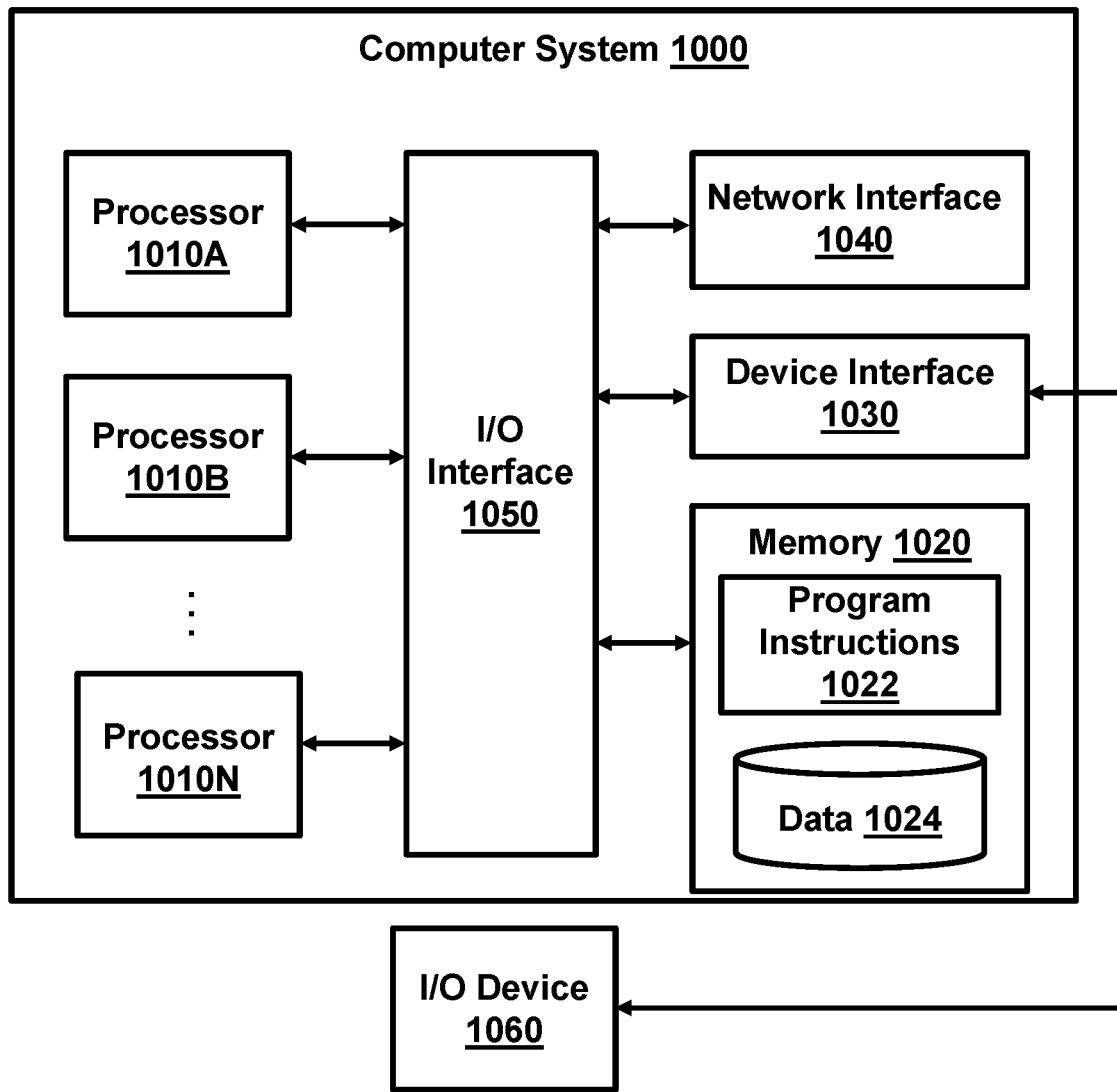
FIG. 10 shows an example of a computing device, in accordance with one or more embodiments.

A more detailed description of an example of a computing device that may be used to implement the functionalities of computer system 102 (or any of subsystems 112-124), client device 104, or both is detailed below with reference to FIG. 10. FIG. 10 shows an example of a computing device, in accordance with one or more embodiments.

Computer system 1000 may include one or more processors (e.g., processors 1010A-1010N) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computer system 1000 may be a uni-processor system including one processor (e.g., processor 1010A), or a multi-processor system including any number of suitable processors (e.g., processors 1010A-1010N). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, such as, for example, a FPGA (field programmable gate array) or an ASIC (application specific integrated circuit). Computer system 1000 may include a plurality of computing devices (e.g., distributed computer systems) to implement various processing functions.

I/O device interface 1030 may provide an interface for connection of one or more I/O devices 1060 to computer system 1000. I/O devices 1060 may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040. In some embodiments, I/O devices 1060 may be integrated into (e.g., housed in a same structure as other components of) computer system 1000.

Network interface 1040 may include a network adapter that provides for connection of computer system 1000 to a network, such as, for example, network(s) 150. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1022 or data 1024. Program instructions 1022 may be executable by a processor (e.g., one or more of processors 1010A-1010N) to implement one or more embodiments of the present techniques. Program instructions 1022 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010A-1010N) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010A-1010N, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010A-1010N). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to cost constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

Although the present application has been described in detail for the purpose of illustration based on what is currently considered to be the most practical and preferred embodiments, it is to be understood that such detail is solely for that purpose and that the present application is not limited to the disclosed embodiments, but, on the contrary, is intended to cover modifications and equivalent arrangements that are within the scope of the appended claims. For example, it is to be understood that the present application contemplates that, to the extent possible, one or more features of any embodiment can be combined with one or more features of any other embodiment.

The present techniques will be better understood with reference to the following enumerated embodiments:

A1. A method, comprising: receiving one or more images of an object from a first device, the first device being associated with a first account on a communications network; extracting features of the object based on the one or more images; determining one or more content items related to the object based on the features; determining a descriptor associated with at least one of the features; selecting a second account connected to the first account, wherein the second account previously performed a search for the descriptor on the communications network; and providing at least one of the one or more content items to the second account.

A2. The method of embodiment A1, further comprising: generating a visualization of a link to the at least one of the one or more content items; and providing the visualization to the first device to be rendered with the one or more images.

A3. The method of any one of embodiments A1-A2, wherein the visualization comprises an augmented reality visualization.

A4. The method of embodiment A3, wherein providing the visualization to the first device comprises: causing the augmented reality visualization and the one or more images to be displayed within a user interface associated with the communications network.

A5. The method of any one of embodiments A1-A4, wherein the one or more images comprise a live image stream.

A6. The method of embodiment A5, further comprising: causing the live image stream to be displayed within a user interface of the communications network rendered by the first device; and causing a visualization of a link to the at least one of the one or more content items to be displayed within the user interface with the live image stream.

A7. The method of embodiment A6, wherein providing the at least one of the one or more content items comprises: in response to determining that the visualization was interacted by a user with via the user interface rendered by the first device, providing the at least one of the one or more content items to the second account.

A8. The method of embodiment A7, wherein determining that the visualization was interacted with by the user comprises determining that the visualization was at least one of: clicked, tapped, long-pressed, swiped, or selected via a voice command.

A9. The method of any one of embodiments A1-A8, further comprising: determining one or more posts on the communications network comprising the descriptor; and selecting at least one of the one or more posts based on a popularity of each of the one or more posts, wherein providing the at least one of the one or more content items to the second account comprises providing the at least one of the one or more posts to the second account.

A10. The method of embodiment A9, wherein the popularity of each of the one or more posts is determined based on a number of accounts of the communications network that accessed a corresponding post.

A11. The method of embodiment A9, further comprising: generating an augmented reality visualization of a link to the at least one of the one or more posts; causing the one or more images to be displayed within a user interface of the communications network rendered by the first device; and causing the augmented reality visualization to be displayed with the one or more images via the user interface.

A12. The method of any one of embodiments A1-A11, wherein selecting the second account comprises: determining a plurality of accounts on the communications network that are connected to the first account; retrieving search histories related to each of the plurality of accounts; and determining a number of searches related to the descriptor that have been performed by each of the plurality of accounts, wherein the second account is selected based on the number of searches.

A13. The method of embodiment A12, further comprising: generating a connection graph associated with the first account, wherein the first account and each of the plurality of accounts are represented on the connection graph as nodes, and each of the nodes are connected by an edge having a respective weight.

A14. The method of embodiment A13, wherein the second account is selected based on the number of searches performed by the second account and a weight of an edge connecting a first node corresponding to the first account with a second node corresponding to the second account.

A15. The method of any one of embodiments A12-A14, further comprising: obtaining descriptor search information indicating descriptor s previously search by each of the plurality of accounts and a number of instances of each of the descriptor s being searched by a corresponding account, wherein the second account is selected based on a respective number of instances that the second account performed a descriptor search based on the descriptor.

A16. The method of any one of embodiments A1-A15, wherein the one or more content items comprise at least one of a website or webpage related to the object, a post on the communications network related to the object, a document related to the object, or an account on the communications network related to the object.

A17. The method of any one of embodiments A1-A16, wherein receiving the one or more images of the object comprises receiving, from the client device, at least one of a live image stream, an image extracted from a live image stream, an image, set of images, or video captured by the client device and stored in memory of the client device, or an image, set of images, or video captured by the client device and stored by a database in communication with the client device.

A18. The method of any one of embodiments A1-A17, wherein the features of the object are extracted from the one or more images using an object recognition model, wherein the object recognition model comprises a convolutional neural network (CNN).

A19. The method of embodiment A16, wherein the object recognition model is trained based on a training data set comprising a plurality of images depicting objects.

A20. The method of any one of embodiments A18-A19, wherein determining the one or more content items comprises: determining a similarity score between each of the images from training data set and the one or more images; determining whether each similarity score satisfies a similarity condition; responsive to determining that a first similarity score satisfies the similarity condition, determining an object label associated with an object depicted within a corresponding image of the plurality of images; and retrieving search results related to a search performed using the object label as an input to a search system, wherein the one or more content items are selected from the search results.

A21. The method of any one of embodiments A18-A19, wherein determining the one or more content items comprises: determining a similarity score between each of the images from training data set and the one or more images; determining whether each similarity score satisfies a similarity condition; responsive to determining that a first similarity score satisfies the similarity condition, performing a search based on the image, a corresponding image from the training data set, the features extracted from the one or more or images, or features extracted from the corresponding image; and obtaining search results based on the search, wherein the one or more content items are selected based on the search results.

A22. The method of any one of embodiments A1-A21, wherein determining the descriptor comprises: performing a descriptor search via the communications network for descriptors s related to the features; determining one or more descriptors related to the features; and selecting the descriptor based on a similarity score computed with respect to the descriptor and the features.

A23. The method of embodiment A22, wherein performing the descriptor search comprises: determining an object label, object name, object type, object description, or object classification of the object based on the features; and causing a search for descriptors to be performed based on one or more of the object label object name, the object type, the object description, or the object classification being used as an input for the descriptor search.

A24. The method of any one of embodiments A1-A23, wherein: the descriptor is a hashtag, and the communications network is a communications network.

B1. A method, comprising: receiving, from a client device, object identification information indicating an object depicted within one or more images, wherein the client device is associated with a first account on a communications network; determining one or more content items related to the object based on the object identification information; determining a descriptor associated with the object; selecting a second account connected to the first account, wherein the second account previously performed a search for the descriptor on the communications network; and providing at least one of the one or more content items to the second account.

B2. The method of embodiment B1, wherein the object identification information comprises features extracted from the one or more images, wherein the client device is configured to perform feature extraction using an object recognition model.

B3. The method of embodiment B1, wherein the object identification information comprises an object label of the object depicted within the one or more images, the object label being determined based on an object recognition model performed by the client device to the one or more images.

B4. The method of embodiments B2-B3, wherein the object recognition model is trained using a training data set comprising a plurality of images, the object recognition model is configured to execute on the client device, and the object recognition model comprises a neural network including one or more depthwise separable convolutional layers.

B5. The method of any one of embodiments B1-B4, further comprising: generating a visualization of a link to the at least one of the one or more content items; and providing the visualization to the client device to be rendered with the one or more images.

B6. The method of any one of embodiments B1-B5, wherein the visualization comprises an augmented reality visualization.

B7. The method of embodiment B6, wherein providing the visualization to the client device comprises: causing the augmented reality visualization and the one or more images to be displayed within a user interface associated with the communications network.

B8. The method of any one of embodiments B1-B7, wherein the one or more images comprise a live image stream.

B9. The method of embodiment B8, further comprising: causing the live image stream to be displayed within a user interface of the communications network rendered by the client device; and causing a visualization of a link to the at least one of the one or more content items to be displayed within the user interface with the live image stream.

B10. The method of embodiment B9, wherein providing the at least one of the one or more content items comprises: in response to determining that the visualization was interacted with via the user interface, providing the at least one of the one or more content items to the second account.

B11. The method of embodiment B10, wherein determining that the visualization was interacted with comprises determining that the visualization was at least one of: clicked, tapped, long-pressed, swiped, or selected via a voice command.

B12. The method of any one of embodiments B1-B11, further comprising: determining one or more posts on the communications network comprising the descriptor; and selecting at least one of the one or more posts based on a popularity of each of the one or more posts, wherein the at least one of the one or more content items provided to the second account comprises the at least one of the one or more posts.

B13. The method of embodiment B12, wherein the popularity of each of the one or more posts is determined based on a number of accounts of the communications network that accessed a corresponding post.

B14. The method of embodiment B12, further comprising: generating an augmented reality visualization of a link to the at least one of the one or more posts; causing the one or more images to be displayed within a user interface of the communications network rendered by the client device; and causing the augmented reality visualization to be displayed with the one or more images via the user interface.

B15. The method of any one of embodiments B1-B14, wherein selecting the second account comprises: determining a plurality of accounts on the communications network that are connected to the first account; retrieving search histories related to each of the plurality of accounts; and determining a number of searches related to the descriptor that have been performed by each of the plurality of accounts, wherein the second account is selected based on the number of searches.

B16. The method of embodiment B15, further comprising: generating a connection graph associated with the first account, wherein the first account and each of the plurality of accounts are represented on the connection graph as nodes, and each of the nodes are connected by an edge having a respective weight.

B17. The method of embodiment B16, wherein the second account is selected based on the number of searches performed by the second account and a weight of an edge connecting a first node corresponding to the first account with a second node corresponding to the second account.

B18. The method of any one of embodiments B15-B17, further comprising: obtaining descriptor search information indicating descriptors previously search by each of the plurality of accounts and a number of instances of each of the descriptors being searched by a corresponding account, wherein the second account is selected based on a respective number of instances that the second account performed a descriptor search based on the descriptor.

B19. The method of any one of embodiments B1-B18, wherein the one or more content items comprise at least one of a website or webpage related to the object, a post on the communications network related to the object, a document related to the object, or an account on the communications network related to the object.

B20. The method of any one of embodiments B2-B4, wherein determining the one or more content items comprises: determining a similarity score between each of the images from the training data set and the one or more images; determining whether each similarity score satisfies a similarity condition; responsive to determining that a first similarity score satisfies the similarity condition, determining an object label associated with an object depicted within a corresponding image of the plurality of images; and retrieving search results related to a search performed using the object label as an input to a search system, wherein the one or more content items are selected from the search results.

B21. The method of any one of embodiments B2-B4, wherein determining the one or more content items comprises: determining a similarity score between each of the images from training data set and the one or more images; determining whether each similarity score satisfies a similarity condition; responsive to determining that a first similarity score satisfies the similarity condition, performing a search based on the image, a corresponding image from the training data set, the features extracted from the one or more or images, or features extracted from the corresponding image; and obtaining search results based on the search, wherein the one or more content items are selected based on the search results.

B22. The method of any one of embodiments B1-B21, wherein determining the descriptor comprises: performing a descriptor search via the communications network for descriptors related to the features; determining one or more descriptors related to the features; and selecting the descriptor based on a similarity score computed with respect to the descriptor and the features.

B23. The method of embodiment B22, wherein performing the descriptor search comprises: determining an object label, object name, object type, object description, or object classification of the object based on the features; and causing a search for descriptors to be performed based on one or more of the object label object name, the object type, the object description, or the object classification being used as an input for the descriptor search.

B24. The method of any one of embodiments B1-B23, wherein: the descriptor is a hashtag, and the communications network is a communications network.

C1. One or more tangible, non-transitory, machine-readable media storing instructions that, when executed by one or more processors, effectuation operations comprising those of any of embodiments A1-A24 or B1-B24.

D1. A system comprising: one or more processors; and memory storing computer program instructions that, when executed by the one or more processors, cause the one or more processors to effectuate operations comprising those of any of embodiments A1-A24 or B1-B24.

What is claimed is:

1. A system, comprising:
a computer system comprising one or more processors programmed with computer program instructions that, when executed, cause the computer system to:
receive, via a camera of a user device, a live image stream comprising an object;
extract, using an object recognition model, features of the object;
determine a first descriptor on a communications network based on at least one of the features of the object, wherein the user device is associated with a first account on the communications network;
determine a uniform resource locator (URL) for a webpage related to the object based on the features;
determine accounts on the communications network that are connected to the first account;
retrieve data indicating descriptors that were previously searched on the communications network by the accounts;
determine, based on the retrieved data, a first number of searches performed by each of the accounts for each of the descriptors, wherein the descriptors include the first descriptor;
select a second account on the communications network connected to the first account from the accounts based on a number of searches of the first descriptor performed by the second account on the communications network;
provide, to the second account, a first augmented reality visualization of a first link to the URL in response to the live image stream being received;
provide the first link to the URL to the second account in response to determining that the first augmented reality visualization was interacted with via a user interface of the communications network displayed by the user device.

2. The system of claim 1, wherein the computer program instructions, when executed by the one or more processors, further cause the computer system to:
generate an augmented reality visualization of the first link to the URL; and
cause the augmented reality visualization to be rendered within the user interface of the communications network displayed by the user device, wherein the augmented reality visualization is overlaid on the live image stream displayed by the user interface.

3. The system of claim 1, wherein the computer program instructions, when executed by the one or more processors, further cause the computer system to:
determine one or more posts on the communications network that include the first descriptor;
generate a second augmented reality visualization of a second link to at least one of the one or more posts, wherein the at least one of the one or more posts is selected for the second augmented reality visualization based on a number of accounts that viewed the one or more posts; and
cause the second augmented reality visualization to be rendered within the user interface of the communications network displayed by the user device, wherein the second augmented reality visualization is overlaid on the live image stream displayed by the user interface.

4. A non-transitory computer readable medium storing computer program instructions that, when executed by one or more processors of a computing device, effectuate operations comprising:
receiving a live image stream comprising one or more images of an object from a first device, the first device being associated with a first account on a communications network;
causing the live image stream to be displayed within a user interface of the communications network rendered by the first device;
extracting features of the object based on the one or more images;
determining one or more content items related to the object based on the features;

causing a visualization of a link to at least one of the one or more content items to be displayed within the user interface with the live image stream;

determining a descriptor associated with at least one of the features;

selecting a second account connected to the first account, wherein the second account previously performed a search for the descriptor on the communications network; and in response to determining that the visualization was interacted with by a user via the user interface rendered by the first device, providing the at least one of the one or more content items to the second account.

5. The non-transitory computer readable medium of claim 4, wherein the operations further comprise:

generating the visualization of the link to the at least one of the one or more content items; and providing the visualization to the first device to be rendered with the live image stream.

6. The non-transitory computer readable medium of claim 5, wherein the visualization comprises an augmented reality visualization, providing the visualization to the first device comprises:

causing the augmented reality visualization and the live image stream to be displayed within the user interface of the communications network.

7. The non-transitory computer readable medium of claim 4, wherein the operations further comprise:

determining one or more posts on the communications network comprising the descriptor; and selecting at least one of the one or more posts based on a popularity of each of the one or more posts, wherein providing the at least one of the one or more content items to the second account comprises providing the at least one of the one or more posts to the second account.

8. The non-transitory computer readable medium of claim 7, wherein the operations further comprise:

generating an augmented reality visualization of a link to the at least one of the one or more posts; and causing the augmented reality visualization to be displayed with the live image stream via the user interface.

9. The non-transitory computer readable medium of claim 4, wherein selecting the second account comprises:

determining a plurality of accounts connected to the first account;

retrieving search results related to each of the plurality of accounts; and determining a number of searches related to the descriptor that have been performed by each of the plurality of accounts, wherein the second account is selected based on the number of searches.

10. A method implemented by one or more processors executing one or more computer program instructions that, when executed, perform the method, the method comprising:

receiving a live image stream comprising one or more images of an object from a first device, the first device being associated with a first account on a communications network;

causing the live image stream to be displayed within a user interface of the communications network rendered by the first device;

extracting features of the object based on the one or more images;

determining one or more content items related to the object based on the features;

causing a visualization of a link to at least one of the one or more content items to be displayed within the user interface with the live image stream;

determining a descriptor associated with at least one of the features;

selecting a second account connected to the first account, wherein the second account previously performed a search for the descriptor on the communications network; and in response to determining that the visualization was interacted with by a user via the user interface rendered by the first device, providing the at least one of the one or more content items to the second account.

11. The method of claim 10, further comprising:

generating the visualization of the link to the at least one of the one or more content items; and providing the visualization to the first device to be rendered with the live image stream.

12. The method of claim 11, wherein the visualization comprises an augmented reality visualization, providing the visualization to the first device comprises:

causing the augmented reality visualization and the live image stream to be displayed within the user interface of the communications network.

13. The method of claim 10, further comprising:

determining one or more posts on the communications network comprising the descriptor; and selecting at least one of the one or more posts based on a popularity of each of the one or more posts, wherein the at least one of the one or more content items provided to the second account comprises the at least one of the one or more posts.

14. The method of claim 13, further comprising:

generating an augmented reality visualization of a link to the at least one of the one or more posts; and causing the augmented reality visualization to be displayed with the live image stream via the user interface.

15. The method of claim 10, wherein selecting the second account comprises:

determining a plurality of accounts connected to the first account;

retrieving search results related to each of the plurality of accounts; and determining a number of searches related to the descriptor that have been performed by each of the plurality of accounts, wherein the second account is selected based on the number of searches.

* * * * *